US010451791B2

(12) United States Patent
Yun et al.

(10) Patent No.: US 10,451,791 B2
(45) Date of Patent: Oct. 22, 2019

(54) DISPLAY DEVICE AND MANUFACTURING METHOD THEREOF

(71) Applicant: Samsung Display Co., Ltd., Yongin-Si, Gyeonggi-Do (KR)

(72) Inventors: Haeju Yun, Hwaseong-si (KR); Kwangsoo Bae, Suwon-si (KR); Jungsuk Bang, Seoul (KR); Minjeong Oh, Gimpo-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/724,689

(22) Filed: Oct. 4, 2017

(65) Prior Publication Data
US 2018/0106941 A1 Apr. 19, 2018

(30) Foreign Application Priority Data
Oct. 14, 2016 (KR) .................. 10-2016-0133809

(51) Int. Cl.
*F21V 7/04* (2006.01)
*F21V 8/00* (2006.01)
*G02B 3/00* (2006.01)

(52) U.S. Cl.
CPC ............ *G02B 6/005* (2013.01); *G02B 3/005* (2013.01); *G02B 3/0056* (2013.01); *G02B 6/0065* (2013.01); *G02B 6/0055* (2013.01)

(58) Field of Classification Search
CPC .......... G02B 26/02; G02B 3/14; G02B 6/005; G02B 3/005; G02B 3/0056; G02B 6/0065; G02B 6/0055; G02F 1/133526; H01L 27/3232; H01L 51/5265; H01L 51/5275
See application file for complete search history.

(56) References Cited

U.S. PATENT DOCUMENTS

| 6,011,602 | A | 1/2000 | Miyashita et al. |
| 8,368,844 | B2 | 2/2013 | Ishikawa et al. |
| 2012/0133575 | A1* | 5/2012 | Hasegawa ........... H01L 51/5265 345/76 |
| 2014/0034919 | A1* | 2/2014 | Park ................... H01L 51/5275 257/40 |
| 2016/0062021 | A1 | 3/2016 | Won et al. |
| 2016/0077328 | A1* | 3/2016 | Chong .................. G02B 26/02 349/62 |
| 2016/0078819 | A1 | 3/2016 | Park et al. |
| 2016/0091648 | A1 | 3/2016 | Bang et al. |
| 2016/0097889 | A1 | 4/2016 | Kim et al. |
| 2016/0127719 | A1 | 5/2016 | Jeon et al. |
| 2016/0170127 | A1 | 6/2016 | Kim et al. |

(Continued)

FOREIGN PATENT DOCUMENTS

| KR | 100453398 B1 | 6/2005 |
| KR | 101274826 B1 | 6/2013 |
| KR | 1020180005786 A | 1/2018 |

*Primary Examiner* — Thien T Mai
(74) *Attorney, Agent, or Firm* — Cantor Colburn LLP

(57) ABSTRACT

A display device includes a light source which generates light, a light guide member which guides the light, and a light collecting member disposed on the light guide member to collect the light provided from the light guide member. The light collecting member includes a plurality of central areas, a plurality of ring areas respectively surrounding the plurality of central areas, and a peripheral area surrounding the plurality of ring areas.

16 Claims, 23 Drawing Sheets

(56) References Cited

U.S. PATENT DOCUMENTS

2016/0177181 A1 6/2016 Liu et al.
2016/0187558 A1 6/2016 Jung
2018/0011235 A1 1/2018 Bae et al.

\* cited by examiner

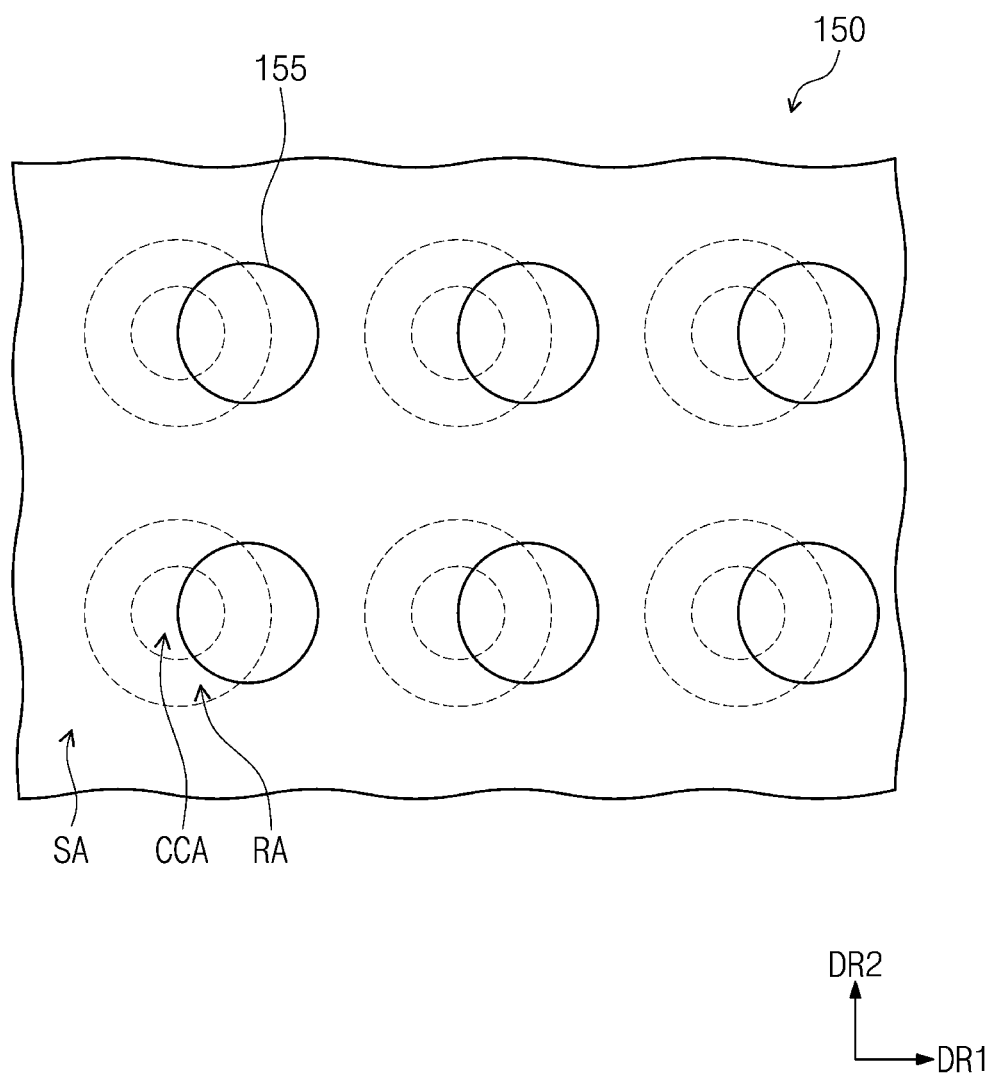

DISPLAY DEVICE AND MANUFACTURING METHOD THEREOF

DISPLAY DEVICE AND MANUFACTURING METHOD THEREOF

This application claims priority to Korean Patent Application No. 10-2016-0133809, filed on Oct. 14, 2016, and all the benefits accruing therefrom under 35 U.S.C. § 119, the content of which in its entirety is herein incorporated by reference.

BACKGROUND

1. Field

Exemplary embodiments of the invention herein relate to a display device and a manufacturing method thereof, and more particularly, to a display device capable of increasing a light emitting efficiency and having a reduced thickness and a manufacturing method thereof.

2. Description of the Related Art

In general, a display device includes a display panel displaying an image using light and a backlight unit generating light and providing the light to the display panel. The display panel includes a first substrate on which a plurality of pixels is disposed, a second substrate disposed to face the first substrate, and an image display layer disposed between the first and second substrates. As the backlight unit, an edge type backlight unit disposed on a side surface of the display device to generate light may be used, for example.

As the image display layer is driven by the plurality of pixels and a transmittance of light provided from the backlight unit to the display panel is adjusted by the image display layer, the image may be displayed. The image display layer may include a liquid crystal layer, an electrowetting layer, or an electrophoretic layer, for example.

The edge type backlight unit includes a light source to generate light, a light guide member to guide light provided from the light source to the display panel in an upward direction, and an optical sheet disposed between the light guide member and the display panel to collect light provided from the light guide member to provide the collected light to the display panel in the upward direction.

The optical sheet includes a diffusion sheet which diffuses light, a prism sheet disposed on the diffusion sheet to collect the light, and a protection sheet disposed on the prism sheet to protect the prism sheet.

SUMMARY

In general, an optical sheet including a plurality of sheets may have a thickness of about 0.5 millimeter (mm), and a display device may increase in thickness due to the optical sheet.

Exemplary embodiments of the invention herein relate to a display device and a manufacturing method thereof, and more particularly, to a display device capable of increasing a light emitting efficiency and having a reduced thickness and a manufacturing method thereof.

An exemplary embodiment of the invention provides a display device including a light source which generates light, a light guide member which guides the light, and a light collecting member disposed on the light guide member to collect the light provided from the light guide member.

Here, the light collecting member includes a first insulation layer including a plurality of central areas, a plurality of ring areas respectively surrounding the plurality of central areas, and a peripheral area surrounding the plurality of ring areas and disposed on the light guide member, where the peripheral area is spaced farther than the plurality of central areas from the light guide member, the plurality of ring areas connect the peripheral area to the plurality of central areas, the peripheral area and the plurality of ring areas define a first cavity, and the plurality of central areas and the plurality of ring areas define a plurality of second cavities, a plurality of insulation patterns disposed on the first insulation layer and disposed inside the plurality of second cavities, and a plurality of optical lenses disposed on the plurality of insulation patterns and each of which overlaps a portion of the plurality of central areas, a portion of the plurality of ring areas, and the peripheral area and has an upwardly convex surface.

In an exemplary embodiment, the first insulation layer may have a refractive index greater than that of each of the plurality of insulation patterns.

In an exemplary embodiment, each of the plurality of insulation patterns may have a truncated cone shape having a diameter gradually decreasing from a lower portion to an upper portion thereof, each of the plurality of insulation patterns may have a trapezoidal shape on a cross-section, and each of side surfaces of the plurality of insulation patterns may define an angle of about 60° with respect to the light guide member on the cross-section.

In an exemplary embodiment, in a plan view, the plurality of optical lenses may overlap central points of the plurality of insulation patterns, respectively.

In an exemplary embodiment, each of the plurality of optical lenses may have a dome shape, and each of the plurality of optical lenses may have a circular shape in a plan view.

In an exemplary embodiment, when a diameter of a bottom surface of each of the plurality of optical lenses is defined as A, and a largest distance among distances from a central point of the bottom surface of each of the plurality of optical lenses to a top surface of each of the plurality of optical lenses is defined as B, a ratio of B to A may be equal to or greater than about 0.3.

In an exemplary embodiment, each of the plurality of central areas may overlap at least two optical lenses among the plurality of optical lenses, the light guide member may include a first side surface and a second side surface facing the first side surface, the light source may be disposed adjacent to the first side surface, and the display device may further include a reflective plate disposed adjacent to the second side surface in the light guide member to reflect the light toward the first side surface.

In an exemplary embodiment, each of the plurality of optical lenses may have a semi-cylindrical shape having a rectangular shaped bottom surface including a long side parallel to a first direction and a short side parallel to a second direction perpendicular to the first direction, each of the plurality of optical lenses may overlap a portion of central areas, which are arranged in the first direction, among the plurality of central areas, and the light source may emit the light in the second direction.

In an exemplary embodiment, the light collecting member may further include a second insulation layer disposed below the first insulation layer and disposed in the first cavity, and the second insulation layer may have a refractive index less than that of each of the first insulation layer and the light guide member.

In an exemplary embodiment, the display device may further include a metal layer disposed between the second insulation layer and the light guide member to reflect the light downward.

In an exemplary embodiment, the first insulation layer may have a refractive index equal to or greater than about 1.7.

In an exemplary embodiment, the first insulation layer may further include an inorganic material, the second insulation layer may include an organic material, and each of the plurality of insulation patterns may include an organic material.

In an exemplary embodiment, the light collecting member may further include a planarizing layer extending upward from the plurality of insulation patterns, parallel to the light guide member, and including an organic material and the planarizing layer is unitary with the plurality of insulation patterns.

In an exemplary embodiment, the light collecting member may further include a second insulation layer disposed below the first insulation layer and disposed in the first cavity, and the first insulation layer may have a thickness equal to or greater than about 0.6 micrometer (μm) and equal to or less than about 1.0 μm, and each of bottom surfaces of the plurality of ring areas may have a width less than a height of the second insulation layer.

In an exemplary embodiment, air is contained in the first cavity, a plurality of through-holes may be defined in the peripheral area, and the air may contact the planarizing layer through the plurality of through-holes.

In an exemplary embodiment, the light may be reflected toward top surfaces of the plurality of ring areas by bottom surfaces of the plurality of ring areas, and the light reflected toward the top surfaces of the ring areas may be refracted by the top surfaces of the ring areas to pass through the plurality of optical lenses.

In an exemplary embodiment of the invention, a method for manufacturing a display device includes providing a light guide member, forming a light collecting member which collects light provided from the light guide member on the light guide member, and providing a display panel which receives the collected light from the light collecting member on the light collecting member. Here, the forming the light collecting member includes forming a first insulation layer including a plurality of central areas, a plurality of ring areas respectively surrounding the plurality of central areas, and a peripheral area surrounding the plurality of ring areas, in which the peripheral area is spaced farther than the plurality of central areas from the light guide member, the plurality of ring areas connect the peripheral area to the plurality of central areas, a first cavity is defined by the peripheral area and the plurality of ring areas, and a plurality of second cavities is defined by the plurality of central areas and the plurality of ring areas, forming a plurality of insulation patterns disposed on the first insulation layer and disposed in the plurality of second cavities, coating an organic layer on the plurality of insulation patterns, and etching the organic layer to form a plurality of optical lenses overlapping a portion of the plurality of central areas, a portion of the plurality of ring areas, and the peripheral area and each of which has an upwardly convex surface.

In an exemplary embodiment of the invention, a method for manufacturing a display device includes providing a light guide member, forming a metal layer on a top surface of the light guide member, etching the metal layer to define a plurality of openings in the metal layer, forming a light collecting member on the light guide member to cover the etched metal layer, and providing a display panel which receives the collected light from the light collecting member on the light collecting member. Here, the forming of the light collecting member includes patterning a first insulation layer including an organic material on the etched metal layer, depositing a second insulation layer to form a cavity spaced from the light guide member by a predetermined distance and in which the first insulation layer is disposed, and forming a plurality of insulation patterns, each of which has a surface area gradually decreasing form a lower portion to an upper portion thereof in a plan view, on the second insulation layer, and bottom surface of the plurality of insulation patterns respectively overlap the plurality of openings, and the first insulation layer is disposed between adjacent insulation patterns of the plurality among the plurality of insulation patterns in the plan view.

In an exemplary embodiment, the method may further include coating an organic layer on the plurality of insulation patterns, and etching the organic layer to form a plurality of optical lenses overlapping a portion of the plurality of insulation patterns and a portion of the plurality of openings in the plan view.

In an exemplary embodiment, the second insulation layer may have a refractive index equal to or greater than about 1.7.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain principles of the invention. In the drawings:

FIG. 3 is a plan view of an exemplary embodiment of a light collecting member according to the invention;

DETAILED DESCRIPTION

Figure 1:
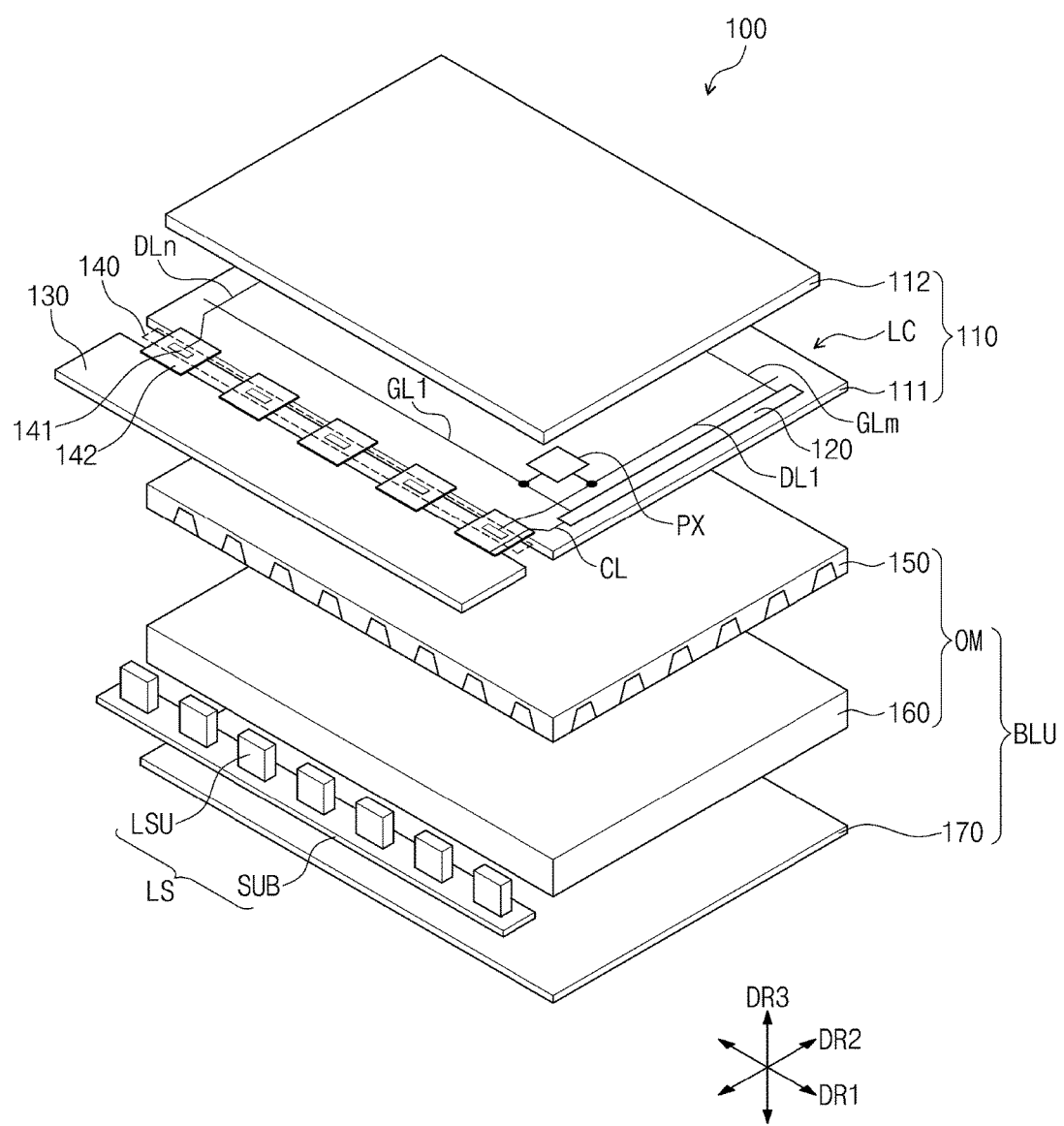
FIG. 1 is a perspective view of an exemplary embodiment of a display device according to the invention.

Hereinafter, exemplary embodiments of the invention will be described with reference to the accompanying drawings. When it is described that an element such as a region, layer, or portion is "disposed on", "connected to", or "coupled to" another element, it should be understood that the element may be directly disposed on, coupled to, or connected to the other element but still another element may be disposed between them.

Like reference numerals refer to like elements throughout. Also, in the drawings, the dimensions of components are exaggerated for clarity of illustration. As used herein, the term and/or includes any and all combinations of one or more of the associated listed items.

It will be understood that although the terms of first and second are used herein to describe various elements, these elements should not be limited by these terms. Terms are only used to distinguish one component from other components. For example, a first element referred to as a first element in one embodiment can be referred to as a second element in another exemplary embodiment. Similarly, a second element can be referred to as a first element. The terms of a singular form may include plural forms unless referred to the contrary.

Also, spatially relative terms, such as "below", "lower", "above", and "upper", may be used herein for ease of description to describe an element and/or a feature's relationship to another element(s) and/or feature(s) as illustrated in the drawings. It will be understood that the spatially relative terms are intended to encompass different orientations of the device in use or operation in addition to the orientation depicted in the drawings.

The meaning of 'include' or 'comprise' specifies a property, a region, a fixed number, a step, a process, an element and/or a component but does not exclude other properties, regions, fixed numbers, steps, processes, elements and/or components.

It will be understood that when an element is referred to as being "on" another element, it can be directly on the other element or intervening elements may be therebetween. In contrast, when an element is referred to as being "directly on" another element, there are no intervening elements present.

The terminology used herein is for the purpose of describing particular embodiments only and is not intended to be limiting. As used herein, the singular forms "a," "an," and "the" are intended to include the plural forms, including "at least one," unless the content clearly indicates otherwise.

"Or" means "and/or." As used herein, the term "and/or" includes any and all combinations of one or more of the associated listed items.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

FIG. 1 is a perspective view of a display device according to an exemplary embodiment of the invention.

Referring to FIG. 1, a display device 100 according to an exemplary embodiment of the invention includes a display panel 110, a gate driving part 120, a printed circuit board ("PCB") 130, a data driving part 140, and a backlight unit BLU. The display panel 110 has a long side in a first direction DR1 and a short side in a second direction DR2 crossing to the first direction DR1.

The backlight unit BLU generates and collects light to provide the light to the display panel 110. The display panel 110 displays an image by the light provided from the backlight unit BLU.

The display panel 110 may include a first substrate 111, a second substrate 112 facing the first substrate 111, and a liquid crystal layer LC disposed between the first substrate 111 and the second substrate 112. A plurality of pixels PX, a plurality of gate lines GL1 to GLm, and a plurality of data lines DL1 to DLn are disposed on the first substrate 111. Here, reference numerals m and n are natural numbers. Although one pixel PX is illustrated in FIG. 1 for convenience of description, the plurality of pixels PX are substantially disposed on the first substrate 111.

The gate lines GL1 to GLm and the data lines DL1 to DLn are insulated with each other and cross each other. The gate lines GL1 to GLm extend in the first direction DR1 and are connected to a gate driving part 120. The data lines DL1 to DLn extend in the second direction D2 and are connected to the data driving part 140.

The pixels PX are disposed on areas divided by the gate lines GL1 to GLm and the data lines DL1 to DLn. The pixels PX are arranged in a matrix form and connected to the gate lines GL1 to GLm and the data lines DL1 to DLn.

The gate driving part 120 is disposed on a predetermined area of the first substrate 111, which is disposed adjacent to one side of the first substrate 111, in the first direction DR1. The gate driving part 120 may be simultaneously provided with transistors of the pixels PX using the same process and disposed (e.g., mounted) on the first substrate 111 in a form of amorphous silicon TFT gate driver circuit ("ASG") or oxide silicon TFT gate driver circuit ("OSG"), for example.

However, the invention is not limited thereto. In an exemplary embodiment, the gate driving part 120 may include a plurality of driving chips, is disposed (e.g., mounted) on a flexible PCB, and is connected to the first substrate 111 in a tape carrier package ("TCP") method, for example. In an exemplary embodiment, the gate driving part 120 may include the plurality of driving chips and is disposed (e.g., mounted) on the first substrate 111 in a chip on glass ("COG") method, for example.

A timing controller (not shown) is disposed on a PCB 130. The timing controller may be disposed (e.g., mounted) on the PCB 130 in a type of an integrated circuit ("IC") chip and connected to the gate driving part 120 and the data driving part 140. The timing controller outputs a gate control signal, a data control signal, and image data.

The gate driving part 120 receives the gate control signal from the timing controller through a control line CL. The gate driving part 120 may generate a plurality of gate signals in response to the gate control signal and sequentially output the generated gate signals. The gate signals are provided for each row to the pixels PX11 to PXmn through the gate lines GL1 to GLm. As a result, the pixels PX may be driven for each row.

The data driving part 140 includes a plurality of source driving chips 141. The source driving chips 141 are disposed (e.g., mounted) on flexible circuit boards 142 and connected to a predetermined area of one side of the first substrate 111 and the PCB (also referred to as "driving circuit board") 130 in the second direction DR2. That is, the data driving part 140 is connected to the first substrate 111 and the driving circuit board 130 in the tape carrier package ("TCP") method, for example. However, the invention is not limited thereto. In an exemplary embodiment, the source driving chips 141 of the data driving part 140 may be disposed (e.g., mounted) on the first substrate 111 in the COG method, for example.

The data driving part 140 receives image data and a data control signal from the timing controller. The data driving part 140 generates output analog type data voltages corresponding to the image data in response to the data control signal. The data voltages are provided to the pixels PX through the data lines DL1 to DLn.

The pixels PX receive the data voltages through the data lines DL1 to DLn in response to gate signals provided through the gate lines GL1 to GLm. As the pixels PX display a gradation corresponding to the data voltages, an image may be displayed.

In an exemplary embodiment, the backlight unit BLU may be an edge type backlight unit, for example. However, the invention is not limited thereto. The backlight unit BLU includes an optical member OM, a light source LS, and a reflective sheet 170. The optical member OM may include a light guide member 160 and a light collecting member 150.

Each of the light guide member 160, the light collecting member 150, and the reflective sheet 170 has a long side in the first direction DR1 and a short side in the second direction DR2.

The light collecting member 150 is disposed below the display panel 110, the light guide member 160 is disposed below the light collecting member 150, and the reflective sheet 170 is disposed below the light guide member 160. The light source LS may extend in the first direction DR1 and be disposed adjacent to one side surface of the light guide member 160 in the second direction DR2.

Although the light guide member 160 may include glass, the invention is not limited thereto. In another exemplary embodiment, the light guide member 160 may include a plastic material such as polymethylmethacrylate ("PMMA"), for example. The light guide member 160 has one side surface defined as a light incident surface in the second direction DR2, and light generated from the light source LS is provided to the one side surface of the light guide member 160. The light guide member 160 guides the light provided from the light source LS upward to the display panel 110.

The light source LS includes a light source substrate SUB extending in the first direction DR1 and a plurality of light source units LSU disposed (e.g., mounted) on the light source substrate SUB. The light source units LSU are spaced from each other by a uniform distance in the first direction DR1. The light source units LSU are disposed to face one side surface of the light guide member 160 in the second direction DR2. The light source units LSU generate light, and the light generated from the light source units LSU is provided to the one side surface of the light guide member 160.

The reflective sheet 170 reflects light emitted downward from the light guide member 160 to the display panel 110 in an upward direction.

The light collecting member 150 may collect the light provided from the light guide member 160 in an upward direction crossing a plane parallel to the first direction DR1 and the second direction DR2. The light passing through the light collecting member 150 may travel upward to the display panel 110 and provided to the display panel 110 with a uniform brightness distribution.

The direction vertically crossing the plane parallel to the first direction DR1 and the second direction DR2 may be defined as a third direction DR3 (or normal direction). In an exemplary embodiment, the light collecting member 150 may have a thickness equal to or greater than about 3.5 micrometers (μm) or equal to or less than about 10 μm, for example. The more detailed configuration of the light collecting member 150 will be described below in detail with reference to FIGS. 3 to 4.

Figure 2:
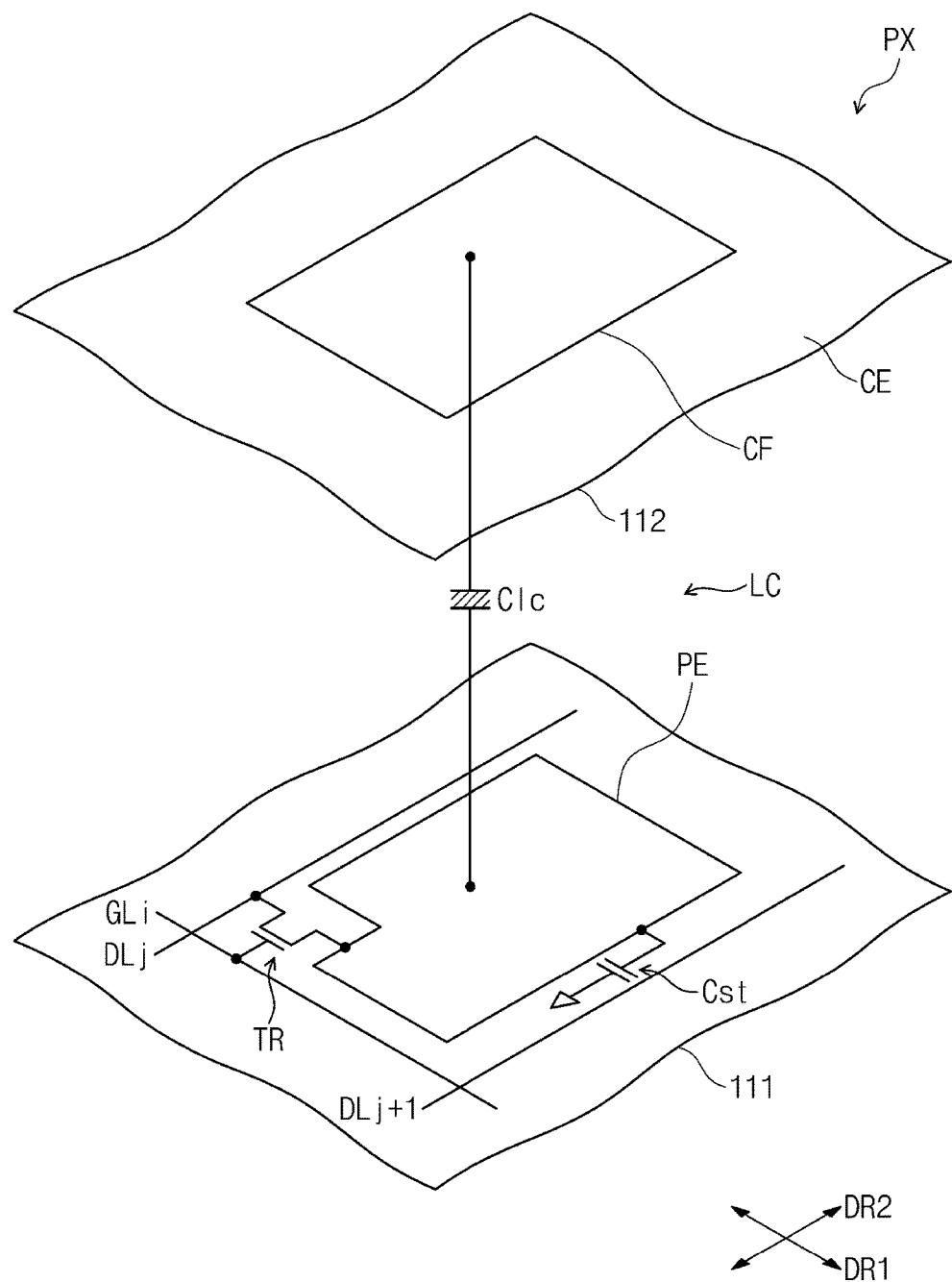
FIG. 2 is a view illustrating a configuration of a pixel in FIG. 1.

FIG. 2 is a view illustrating a configuration of the pixel in FIG. 1.

For convenience of description, the pixel PX connected to the gate line GLi and the data line DLi is illustrated in FIG. 2. Although not shown, other pixels PX of the display panel 110 may have the same configuration as that of the pixel PX in FIG. 2.

Referring to FIG. 2, the pixel PX includes a transistor TR connected to the gate line GLi and data line DLj, a liquid crystal capacitor Clc connected to the transistor TR, and a storage capacitor Cst parallel-connected to the liquid crystal capacitor Clc. In another exemplary embodiment, the storage capacitor Cst may be omitted. Here, reference numerals i and j are natural numbers.

The transistor TR may be disposed on the first substrate 111. The transistor TR includes a gate electrode connected to the gate line GLi, a source electrode connected to the data line DLj, and a drain electrode connected to the liquid crystal capacitor Clc and the storage capacitor Cst.

The liquid crystal capacitor Clc includes a pixel electrode PE disposed on the first substrate 111, a common electrode CE disposed on the second substrate 112, and a liquid crystal layer LC disposed between the pixel electrode PE and the common electrode CE. The liquid crystal layer LC serves as a dielectric substance. The pixel electrode PE is connected to the drain electrode of the transistor TR.

Although the pixel electrode PE has a non-slit structure in FIG. 2, the invention is not limited thereto. In another exemplary embodiment, the pixel electrode PE may have a slit structure including a cross shaped stem and a plurality of branches extending radially from the stem, for example.

The common electrode CE may be disposed on an entire surface of the second substrate 112. However, the invention is not limited thereto. In another exemplary embodiment, the common electrode CE may be disposed on the first substrate 111, for example. In this case, a slit may be defined in at least one of the pixel electrode PE and the common electrode CE.

The storage capacitor Cst may include a pixel electrode PE, a storage electrode (not shown) branched from a storage line (not shown), and an insulation layer disposed between the pixel electrode PE and the storage electrode. The storage line may be disposed on the first substrate 111 and provided on the same layer as that of the gate lines GL1 to GLm (refer to FIG. 1). The storage electrode may partially overlap the pixel electrode PE.

The pixel PX may further include a color filter CF representing one of red, green, and blue colors, for example. In an exemplary embodiment, the color filter CF may be disposed on the second substrate 112 as illustrated in FIG. 2. However, the invention is not limited thereto. In another exemplary embodiment, the color filter CF may be disposed on the first substrate 111, for example.

The transistor TR is turned on in response to a gate signal provided through the gate line GLi. The data voltage received through the data line DLj is provided to the pixel electrode PE of the liquid crystal capacitor Clc through the turned-on transistor TR. A common voltage is applied to the common electrode CE.

An electric field is provided between the pixel electrode PE and the common electrode CE due to a difference between voltage levels of the data voltage PE and the common voltage CE. Liquid crystal molecules of the liquid crystal layer LC are driven by the electric field provided between the data voltage PE and the common voltage CE. As a transmittance is adjusted by the liquid crystal molecules driven by the electric field, an image may be displayed.

A storage voltage having a predetermined voltage level may be applied to the storage line. However, the invention is not limited thereto. In an exemplary embodiment, the common voltage may be applied to the storage line, for example. The storage capacitor Cst serves to complement a voltage charged to the liquid capacitor Clc.

Figure 4A:
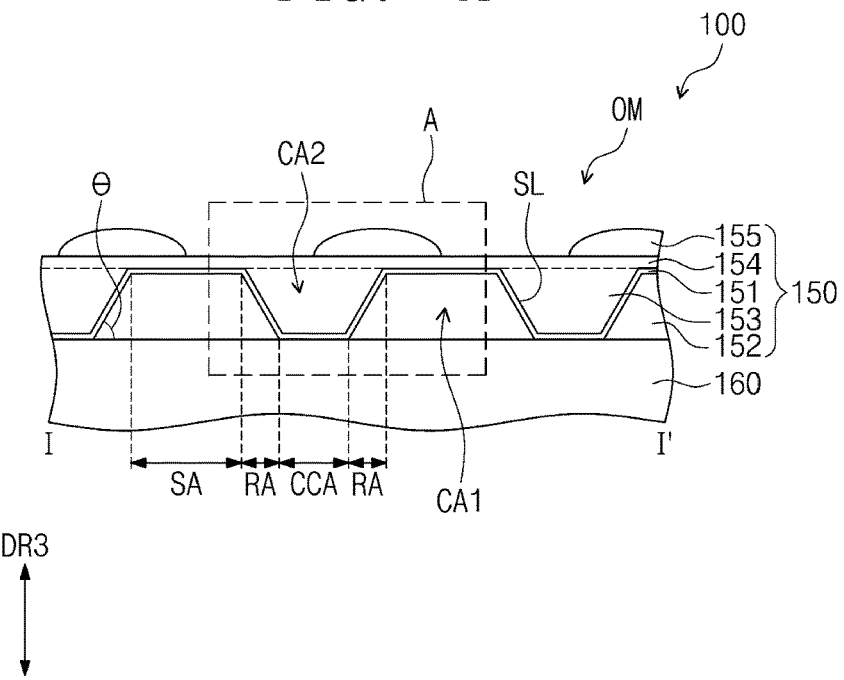
FIG. 4A is a view illustrating an exemplary embodiment of a portion of a cross-sectional view of an optical member according to the invention.
Figure 4B:
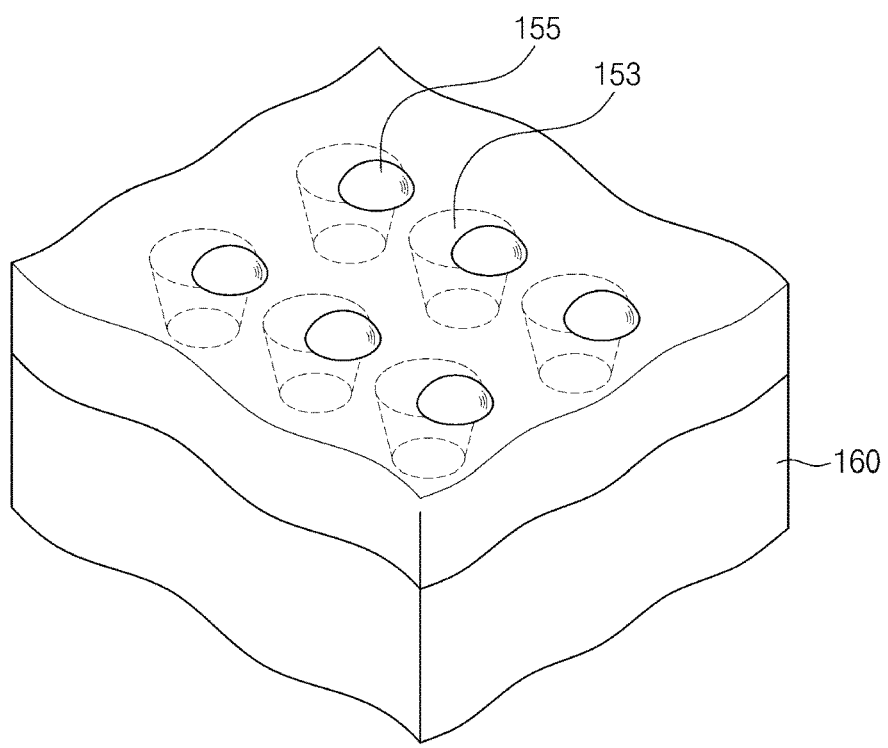
FIG. 4B is a view illustrating an exemplary embodiment of a portion of a perspective view of the optical member according to the invention.

FIG. 3 is a plan view of the light collecting member 150 according to an exemplary embodiment of the invention. FIG. 4A is a view illustrating a portion of a cross-section of the optical member OM according to an exemplary embodiment of the invention. FIG. 4B is a view illustrating a portion of a perspective view of the optical member OM according to an exemplary embodiment of the invention.

Figure 4C:
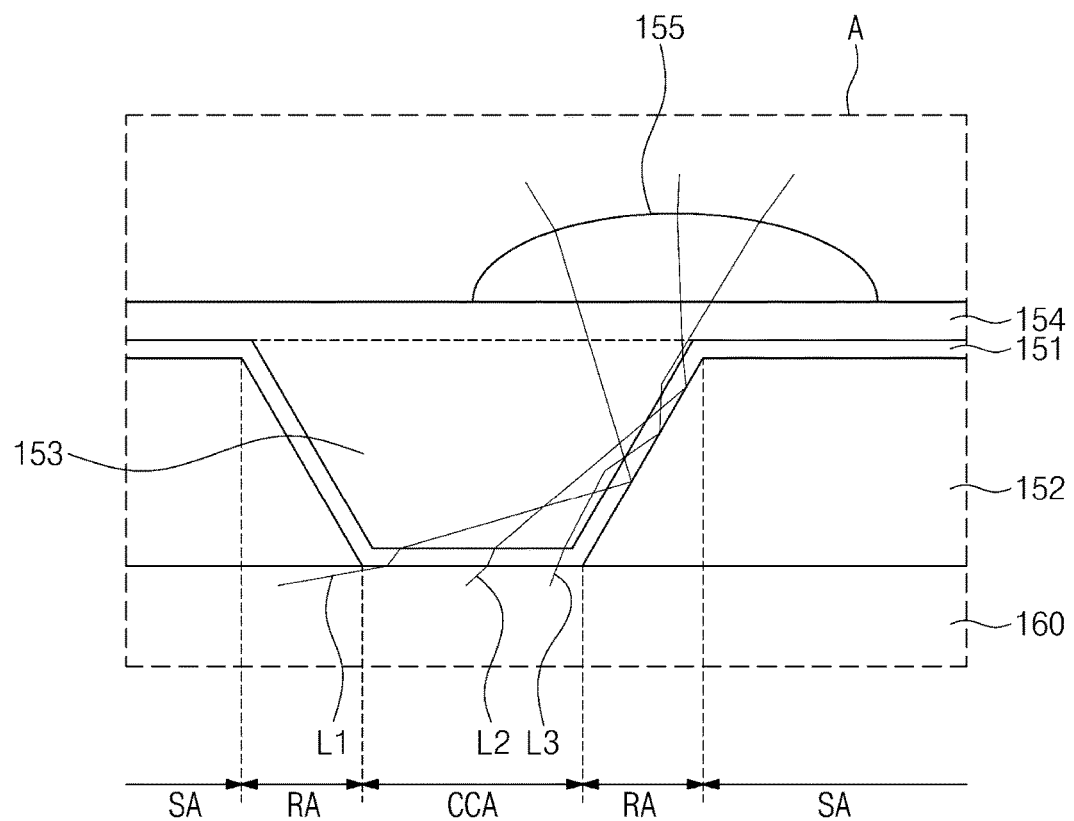
FIG. 4C is a cross-sectional view for explaining a traveling path of light emitted from a light source.

FIG. 4C is a cross-sectional view for explaining a traveling path of light emitted from the light source LS in a portion A of FIG. 4A.

Referring to FIGS. 3, 4A, and 4B, the light collecting member 150 may include a first insulation layer 151, a second insulation layer 152, an insulation pattern 153, a planarizing layer 154, and an optical lens 155.

The first insulation layer 151 may be disposed on the light guide member 160. The first insulation layer 151 may include central areas CCA, ring areas RA respectively surrounding the central areas CCA, and a peripheral area SA. The first insulation layer 151 may further include an inclined portion SL.

As the central areas CCA are arranged in the first and second directions DR1 and DR2 in a plan view, the central areas CCA may be arranged in a matrix form. Likewise, as the ring areas RA are arranged in the first and second directions DR1 and DR2 in the plan view, the ring areas RA may be arranged in the matrix form.

The peripheral area SA may be spaced farther than the central areas CCA from the light guide member 160. As an example of the invention, a bottom surface of each of the central area CCA may be disposed on a top surface of the light guide member 160, and the peripheral area SA may be spaced from the light guide member 160 by a predetermined distance.

The ring areas RA may connect the peripheral area SA to the central areas CCA. In more detail, the ring areas RA may connect the peripheral area SA to the central areas CCA while defining a predetermined angle θ with respect to the light guide member 160.

The peripheral area SA and the plurality of ring areas RA may define a first cavity CA1. In more detail, the peripheral area SA and two ring areas of the plurality of ring areas RA may be connected to each other to define the first cavity CA1 on a cross-section. The first cavity CA1 may be a space provided by a bottom of the peripheral area SA and bottom surfaces of the ring areas RA.

The plurality of central areas CCA and the plurality of ring areas RA may define second cavities CA2. In more detail, one central area of the plurality of central areas CCA and one ring area of the plurality of ring areas RA surrounding the one central area may be connected to each other to define the second cavity CA2. The second cavity CA2 may be defined by a top surface of the central area CCA and top surfaces of the ring areas RA.

As an example of the invention, the first insulation layer 151 may have a thickness equal to or greater than about 0.6 μm and equal to or less than about 1.0 μm. The first insulation layer 151 may overlap an entire surface of a top surface of the light guide member 160 in a thickness direction DR3 (hereinafter, also referred to as a third direction).

Although the first insulation layer 151 may include an inorganic material, the invention is not limited thereto. In other exemplary embodiments, the first insulation layer 151 may include various other materials, for example.

The second insulation layer 152 may be disposed below the first insulation layer 151. The second insulation layer 152 may overlap the peripheral area SA and the ring areas RA and disposed on the top surface of the light guide member 160. In an example of the invention, the second insulation layer 152 may have a trapezoid shape in which a side corresponding to the bottom surface, which is greater than a side corresponding to the top surface on a cross-section, and a side corresponding to the side surface, which defines a predetermined angle with the light guide member 160. The predetermined angle may be an acute angle. As an example of the invention, the second insulation layer 152 may have a height of about 3.5 μm and a predetermined angle of about 60°.

The second insulation layer 152 may be disposed in the first cavity CA1. As an example of the invention, the second insulation layer 152 may have a top surface contacting a bottom surface of the peripheral area SA. The second insulation layer 152 may have a bottom surface contacting the top surface of the light guide member 160. The second insulation layer 152 may have a side surface contacting the bottom surfaces of the ring areas RA.

Also, each of the bottom surfaces of the ring areas RA may have a width less than a height of the second insulation layer 152. As an example of the invention, each of the bottom surfaces of the ring areas RA has a circular shape. In an exemplary embodiment, each of the bottom surfaces of the ring areas RA may have a diameter less than the height of the second insulation layer 152, for example.

Although the second insulation layer 152 may include an organic material, the invention is not limited thereto. In other exemplary embodiments, the second insulation layer 152 may include various other materials.

The insulation pattern 153 may be disposed on the top surface of the first insulation layer 151. The insulation pattern 153 may be disposed in each of the second cavities CA2. As described above, as the second cavity CA2 may be provided in plurality, the insulation pattern 153 may be provided in plurality. As an example of the invention, each of the insulation patterns 153 may have a truncated cone shape. In more detail, each of the insulation patterns 153 may have a truncated cone shape of which a bottom surface having a circular shape has a diameter less than that of a top surface having a circular shape. That is, in a cross-section, each of the insulation patterns 153 may have a trapezoid shape, and each of the side surfaces of the insulation patterns 153 may define an acute angle with the light guide member 160. However, the invention is not limited thereto. In other exemplary embodiment, the insulation patterns 153 may have various other shapes.

As an example of the invention, each of the insulation patterns 153 may have a height of about 2.9 μm, and the acute angle may be about 60 degrees (°).

Although each of the insulation patterns 153 may include an organic material, the invention is not limited thereto. In other exemplary embodiments, each of the insulation patterns 153 may include various other materials.

The planarizing layer 154 may extend upward from the insulation patterns 153 and disposed on the insulation patterns 153. Accordingly, the planarizing layer 154 may connect the insulation patterns 153 to each other. As an example of the invention, the planarizing layer 154 may be unitary with the insulation patterns 153. The planarizing layer 154 may have a plate shape and be parallel to the light guide member 160. As an example of the invention, the planarizing layer 154 may have a plate shape having a height (thickness) of about 4 μm. Although the planarizing layer 154 may include an organic material, the invention is not limited thereto. In other exemplary embodiments, the planarizing layer 154 may include various other materials.

The optical lens 155 may be disposed on the planarizing layer 154. The optical lens may be provided in plurality. However, the invention is not limited thereto. In an exemplary embodiment, the optical lenses 155 may be connected to each other to have a unitary shape and disposed on the planarizing layer 154, for example. Each of the optical lenses 155 may overlap a portion of the central areas CCA, a portion of the ring areas RA, and the peripheral area SA. In more detail, each of the optical lenses 155 may respectively overlap the insulation patterns 153 and, at the same time, overlap the first insulation layer 151 and the second insulation layer 152 in the third direction DR3.

In an exemplary embodiment, each of the optical lenses 155 may have an upwardly convex surface, for example. As an example of the invention, each of the optical lenses 155 may have a dome shape and be a convex lens collecting light. As illustrated in FIG. 3, each of the optical lenses 155 may have a circular shape in the plan view, for example. Each of the optical lenses 155 may have a bottom surface having a circular shape and a curved top surface covering the bottom surface with the dome shape. When a diameter of the bottom surface is defined as A, and a largest distance among distances from a central point of the bottom (center of circle) to the top surface is defined as B, a ratio of B to A (hereinafter, referred to as an aspect ratio) may be equal to or greater than about 0.3, for example.

Each of the optical lenses 155 may include an organic material.

FIG. 4C illustrates light generated from the light source LS (refer to FIG. 1). Although light may include various kinds of light, only three light is representatively illustrated in FIG. 4C. The three light may include first light L1 defining an angle of about 1° with respect to the top surface of the light guide member 160, second light L2 defining an angle of about 30° with respect to the top surface of the light guide member 160, and third light L3 defining an angle of about 55° with respect to the top surface of the light guide member 160, which are divided on the basis of the angle with the top surface of the light guide member 160. However, the invention is not limited thereto. In an exemplary embodiment, the light may further include light defining various angles with respect to the top surface of the light guide member 160.

Hereinafter, refractive indexes of the light guide member 160, the first insulation layer 151, the second insulation layer 152, the insulation patterns 153, and the planarizing layers 154 will be described, and also traveling paths of the first to third light L1 to L3 will be described.

The light guide member 160 may have a refractive index greater than that of the second insulation layer 152. As an example of the invention, since the light guide member 160 may include glass as described above, the light guide member 160 may have a refractive index of about 1.5, and the second insulation layer 152 may have a refractive index of about 1.3. Accordingly, when light traveling in the light guide member 160 is incident into the second insulation layer 152 with a predetermined angle, a total reflection phenomenon may occur.

The first insulation layer 151 may have a refractive index greater than that of the second insulation layer 152. Also, the first insulation layer 151 may have a refractive index greater than that of the light guide member 160. In an exemplary embodiment, the first insulation layer 151 may have a refractive index equal to or greater than about 1.7, for example. In detail, the first insulation layer 151 may have the refractive index of about 1.74, for example. Accordingly, when the light traveling in the light guide member 160 is incident into the second insulation layer 152 with a predetermined angle, the light may be refracted by the second insulation layer 152 and traveled into the second insulation layer 152.

The first insulation layer 151 may have a refractive index greater than that of each of the insulation patterns 153. As an example of the invention, each of the insulation patterns 153 may have a refractive index of about 1.54. In summary, the first insulation layer 151 may have the refractive index greater than that of each of the insulation patterns 153, and each of the insulation patterns 153 may have the refractive index greater than that of the second insulation layer 152.

The first light L1 may be emitted downward at an angle of about 1° with respect to the top surface of the light guide member 160 to pass through the bottom surface of the first insulation layer 151. The first light L1 may be incident into the insulation patterns 153. As described above, since each of the insulation patterns 153 has the refractive index less than that of the first insulation layer 151, the first light L1 incident into the insulation patterns 153 may be incident into the ring area RA through a top surface of one ring area of the ring areas RA. Since the first insulation layer 151 has the refractive index greater than that of the second insulation layer 152, the first light L1 incident into the ring area RA may be reflected toward the top surface of the ring area RA by the bottom surface of the ring area RA. The upwardly reflected first light L1 may be re-incident into the insulation patterns 153 through the top surface of the ring area RA, and the first light L1 may be incident into one optical lens 155 of the optical lenses 155. Also, the first light L1 may be refracted by the optical lens 155. As an example of the invention, the first light L1 may be emitted at an angle of about 60° with respect to the planarizing layer 154 and be incident into the optical lens 155, and refracted by the optical lens 155 at an angle of about 72.5° with respect to the planarizing layer 154, thereby being emitted upward.

The second light L2 may be emitted downward at an angle of about 30° with respect to the top surface of the light guide member 160 to pass through the bottom surface of the first insulation layer 151. The second light L2 may be incident into the insulation patterns 153. As described above, since each of the insulation patterns 153 has the refractive index less than that of the first insulation layer 151, the second light L2 incident into the insulation patterns 153 may be incident into the ring area RA through a top surface of one ring area RA of the ring areas RA. Since the first insulation layer 151 has the refractive index greater than that of the second insulation layer 152, the second light L2 incident into the ring area RA may be reflected toward the top surface of the ring area RA by the bottom surface of the ring area RA. The upwardly reflected second light L2 may be re-incident into the insulation patterns 153 through the top surface of the ring area RA, and the second light L2 may be incident into one optical lens 155 of the optical lenses 155 through the planarizing layer 154. Also, the second light L2 may be refracted by the optical lens 155. As an example of the invention, the second light L2 may be emitted at an angle of about 90° with respect to the planarizing layer 154 and incident into the optical lens 155, and refracted by the optical lens 155 at an angle of about 90° with respect to the planarizing layer 154, thereby being emitted upward.

The third light L3 may be emitted downward at an angle of about 55° with respect to the top surface of the light guide member 160 to pass through the bottom surface of the first insulation layer 151. The third light L3 may be incident into the insulation patterns 153. As described above, since each of the insulation patterns 153 has the refractive index less than that of the first insulation layer 151, the third light L3 incident into the insulation patterns 153 may be incident into the ring area RA through a top surface of one ring area RA of the ring areas RA. Since the first insulation layer 151 has the refractive index greater than that of the second insulation layer 152, the third light L3 incident into the ring area RA may be reflected toward the top surface of the ring area RA by the bottom surface of the ring area RA. The upwardly reflected third light L3 may be re-incident into the insulation patterns 153 through the top surface of the ring area RA, and the third light L3 may be incident into one optical lens 155 of the optical lenses 155 through the planarizing layer 154. Also, the third light L3 may be refracted by the optical lens 155. As an example of the invention, the third light L3 may be emitted at an angle of about 120° with respect to the planarizing layer 154 and incident into the optical lens 155, and refracted by the optical lens 155 at an angle of about 121° with respect to the planarizing layer 154, thereby being emitted upward.

As described above, as the optical lenses 155 are disposed above the insulation patterns 153, while the light emitted at a relatively smaller angle with respect to the bottom surface of the light guide member 160 passes through the optical lenses 155, an emission angle with respect to the planarizing layer 154 may increase. Also, while the light emitting at a relatively larger angle with respect to the bottom surface of the light guide member 160 passes through the optical lenses 155, an emission angle with respect to the planarizing layer 154 may be maintained or precisely increase.

That is, as the optical lens 155 is disposed above the insulation patterns 153, a light collection range of the light decreases to increase a light collection efficiency of the display device.

As an example of the invention, as described above, when each of the insulation patterns 153 has a truncated cone shape, each of the optical lenses 155 may overlap a central point of each of insulation patterns 153 in the plan view as illustrated in FIG. 3. In this case, when an angle of upwardly emitted light with respect to the light guide member 160 is less than that of each of the ring areas RA with respect to the bottom surface of the light guide member 160, the light may pass through all the optical lenses 155. That is, the above-described light collection efficiency of the display device may further increase.

Figure 5A:
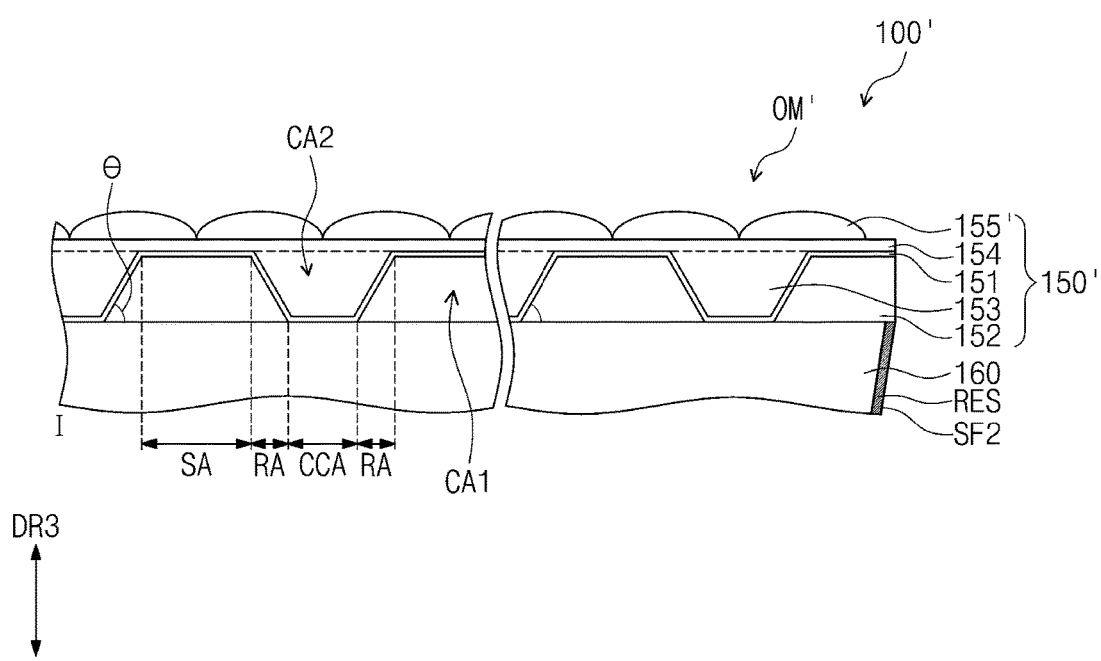
FIG. 5A is a view illustrating another exemplary embodiment of a portion of a cross-sectional view of an optical member according to the invention.
Figure 5B:
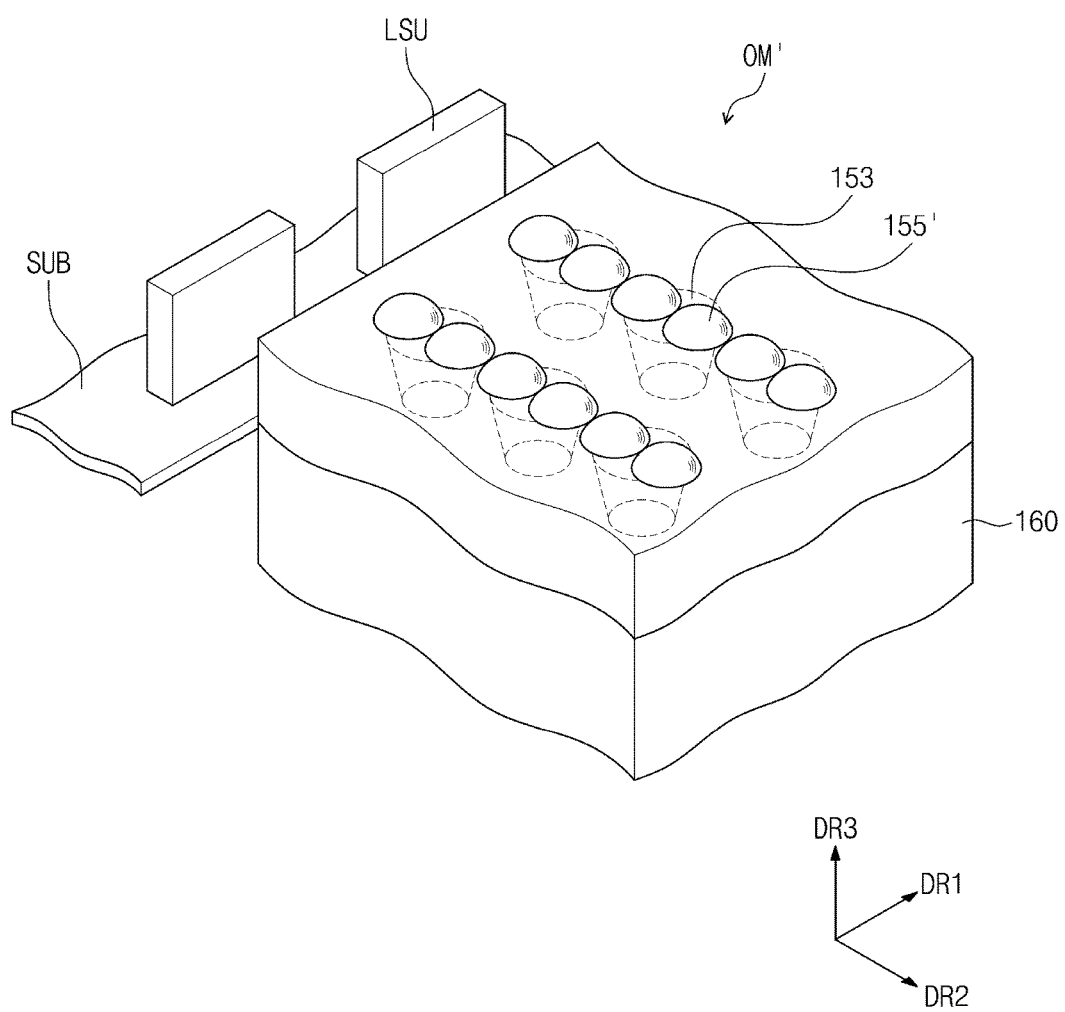
FIG. 5B is a view illustrating a portion of a perspective view of the optical member in FIG. 5A.
Figure 6:
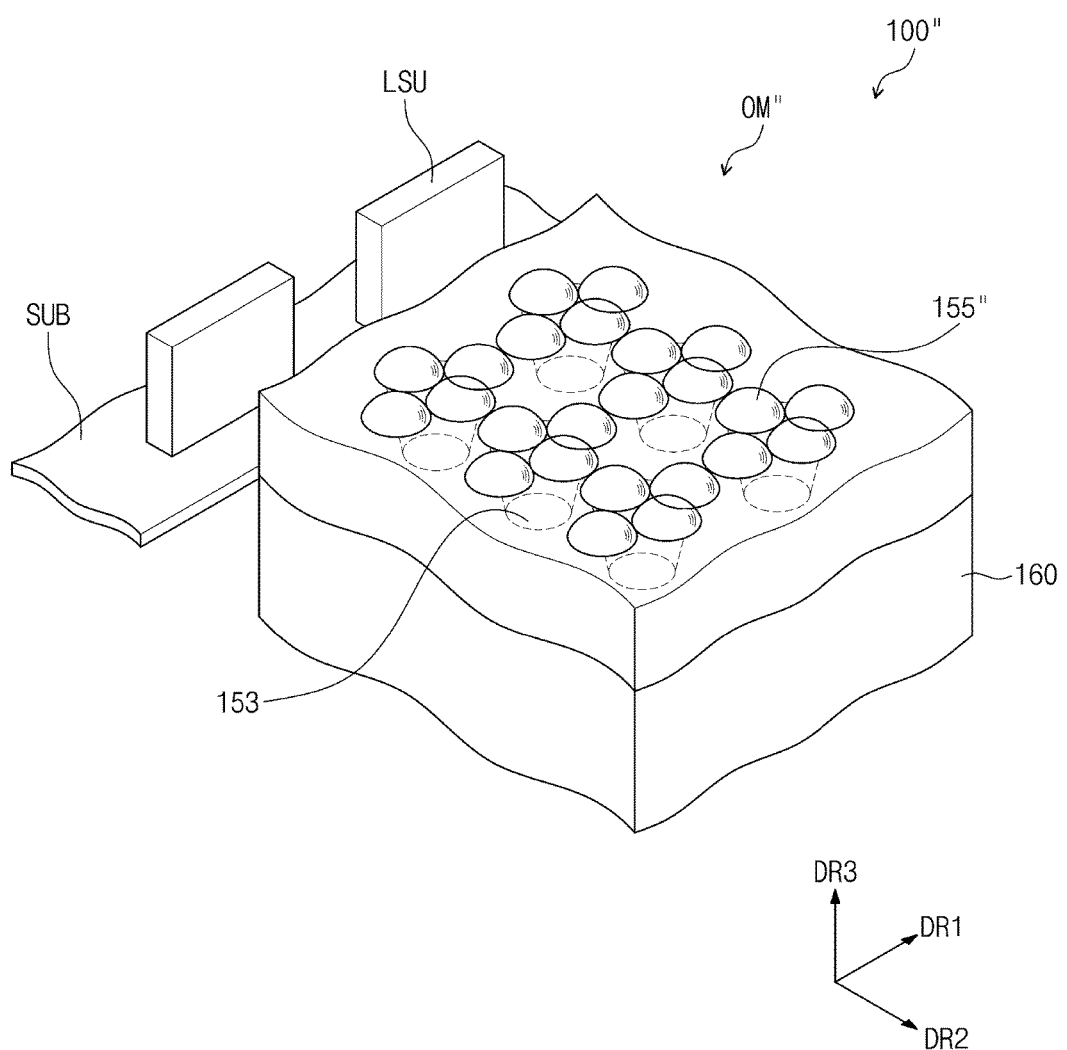
FIG. 6 is a view illustrating another exemplary embodiment of a portion of a perspective view of an optical member according to the invention.

FIG. 5A is a view illustrating a portion of a cross-sectional view of an optical member OM' according to another exemplary embodiment of the invention. FIG. 5B is a view illustrating a portion of a perspective view of the optical member OM' in FIG. 5A. FIG. 6 is a view illustrating a portion of the perspective view of the optical member OM' according to another exemplary embodiment of the invention.

As illustrated in FIGS. 5A and 5B, each of the central areas CCA may overlap two optical lenses of optical lenses 155' of a light collecting member 150' in the third direction DR3. In more detail, each of the two optical lenses of optical lenses 155' may overlap one insulation pattern of the insulation patterns 153 in the third direction DR3 and, at the same time, overlap two different adjacent ring areas RA of the ring areas RA and the peripheral area SA.

The light guide member 160 may include a first side surface (not shown) and a second side surface SF2 facing the first side surface. The light source LS (refer to FIG. 1) may be disposed adjacent to an outside of the first side surface. A reflective plate RES may be disposed adjacent to an inside of the second side surface SF2. The reflective plate RES may include a mirror material. The reflective plate RES reflects light incident from the light source LS into the light guide member 160 toward the first side surface.

As described above, as each of the two optical lenses of optical lenses 155' overlaps one insulation pattern of the insulation patterns 153 in the third direction DR3, the optical lenses 155' may collect all of light guided from the first side surface to the second side surface SF2 by the light guide member 160 and light guided from the second side surface SF2 to the first side surface by reflection of the reflective plate RES to further increase the light collection efficiency of a display device 100'.

The contents that are the same as those described in FIGS. 4A to 4C will be omitted.

Referring to FIG. 6, each of the central areas CCA may overlap four optical lenses of optical lenses 155" in the third direction DR3. In more detail, each of the four optical lenses 155" of the optical lenses 155" may overlap one insulation pattern of the insulation patterns 153 in the third direction DR3 and, at the same time, overlap four different adjacent ring areas RA of the ring areas RA (refer to FIG. 4A, 4C, 5A) and the peripheral area SA.

As described above, as each of the four optical lenses of the optical lenses 155" overlap one insulation pattern of the insulation patterns 153, the light collection efficiency of the display device 100" may further increase.

Figure 7:
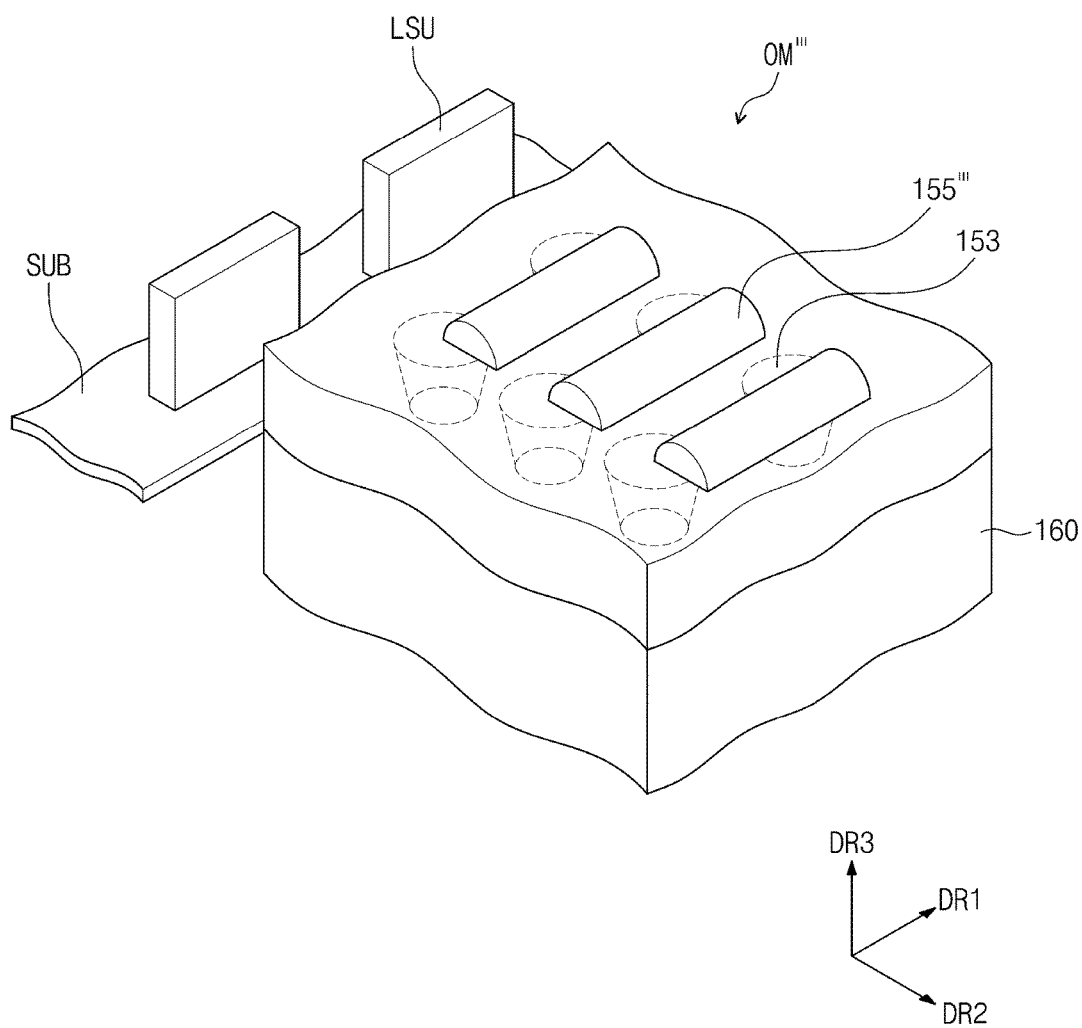
FIG. 7 is a view illustrating another exemplary embodiment of a portion of a perspective view of an optical member according to the invention.
Figure 8:
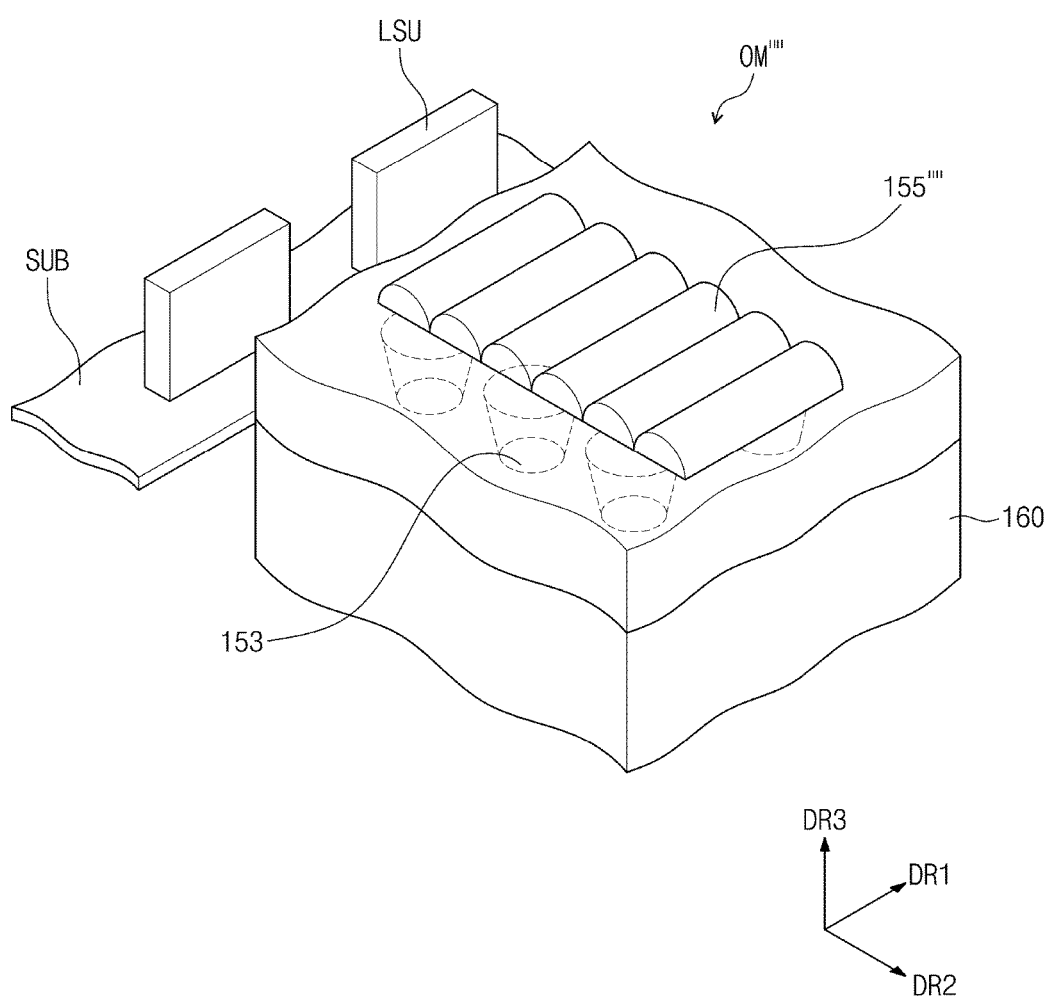
FIG. 8 is a view illustrating another exemplary embodiment of a portion of a perspective view of an optical member according to the invention.

FIG. 7 is a view illustrating a portion of a perspective view of an optical member OM''' according to another exemplary embodiment of the invention. FIG. 8 is a view illustrating a portion of a perspective view of an optical member OM'''' according to another exemplary embodiment of the invention.

Referring to FIG. 7, each of optical lenses 155''' may have a semi-cylindrical shape having a rectangular shaped bottom surface having a long side parallel in the first direction DR1 and a short side parallel in the second direction DR2 perpendicular to the first direction DR1 and a top surface covering the bottom surface from an upper side thereof. The top surface may be a curved surface.

Each of the optical lenses 155''' may overlap a portion of the central areas CCA (refer to FIG. 4A, 4C, 5A) arranged in the first direction DR1 among the central areas CCA. That is, one of the insulation patterns 153 may overlap one optical lens 155' of the optical lenses 155''' in a thickness direction.

The contents that are described in FIGS. 4A and 4C will be omitted.

Referring to FIG. 8, one of the insulation patterns 153 may overlap two optical lenses 155'''' of the optical lenses 155'''' in a thickness direction.

The contents that are described in FIGS. 5A and 5B will be omitted.

As described above, the shapes of the optical lenses are described with reference to FIGS. 3 to 8. However, an exemplary embodiment of the invention is not limited thereto. In other exemplary embodiments, each of the optical lenses may have various other shapes.

Figure 9A:
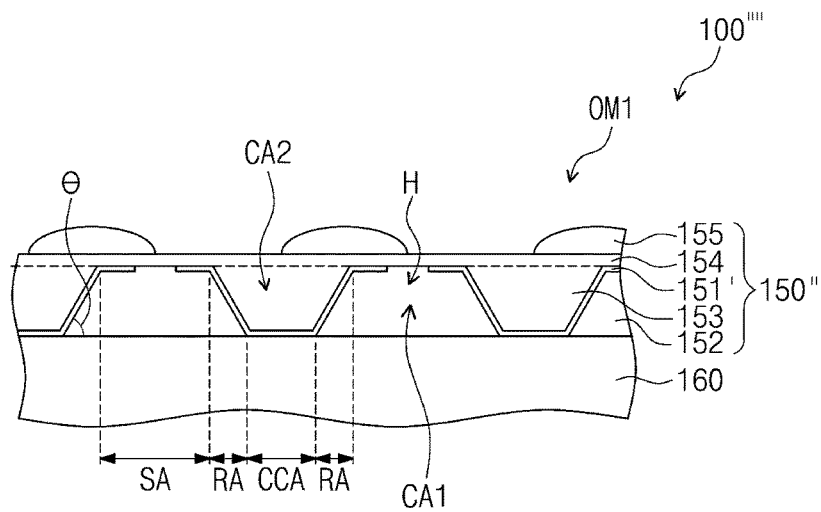
FIG. 9A is a view illustrating another exemplary embodiment of a portion of a cross-sectional view of an optical member according to the invention.
Figure 9B:
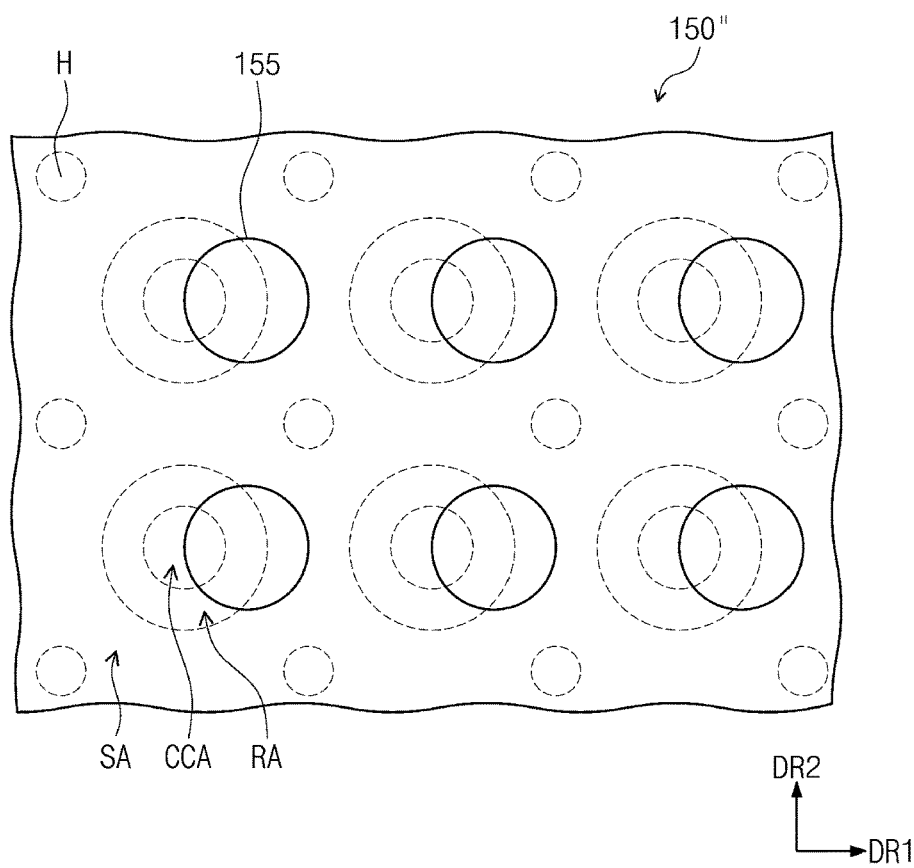
FIG. 9B is a view illustrating another exemplary embodiment of a portion of a plan view of an optical member according to the invention.

FIG. 9A is a view illustrating a portion of a cross-sectional view of an optical member OM1 according to another exemplary embodiment of the invention. FIG. 9B is a view illustrating a portion of a plan view of the optical member OM1 according to another exemplary embodiment of the invention.

Referring to FIGS. 9A and 9B, a through-hole H may be defined in a portion of the peripheral area SA. The second insulation layer 152 of a light collecting member 150" may be removed through the through-hole H. When the second insulation layer 152 is removed from the first cavity CA1, air may be contained therein. As an example of the invention, the air may have a refractive index of about 1. That is, since the air may have the refractive index less than that of the second insulation layer 152, when light traveling in the light guide member 160 is incident into the second insulation layer 152 with a predetermined angle, a critical angle at which the total reflection phenomenon occurs may increase. Accordingly, as the light passing through the second insulation layer 152 decreases, a light collection efficiency of the display device 100'''' may increase.

The contents that are the same as those described in FIGS. 4A to 4C will be omitted.

Figure 10:
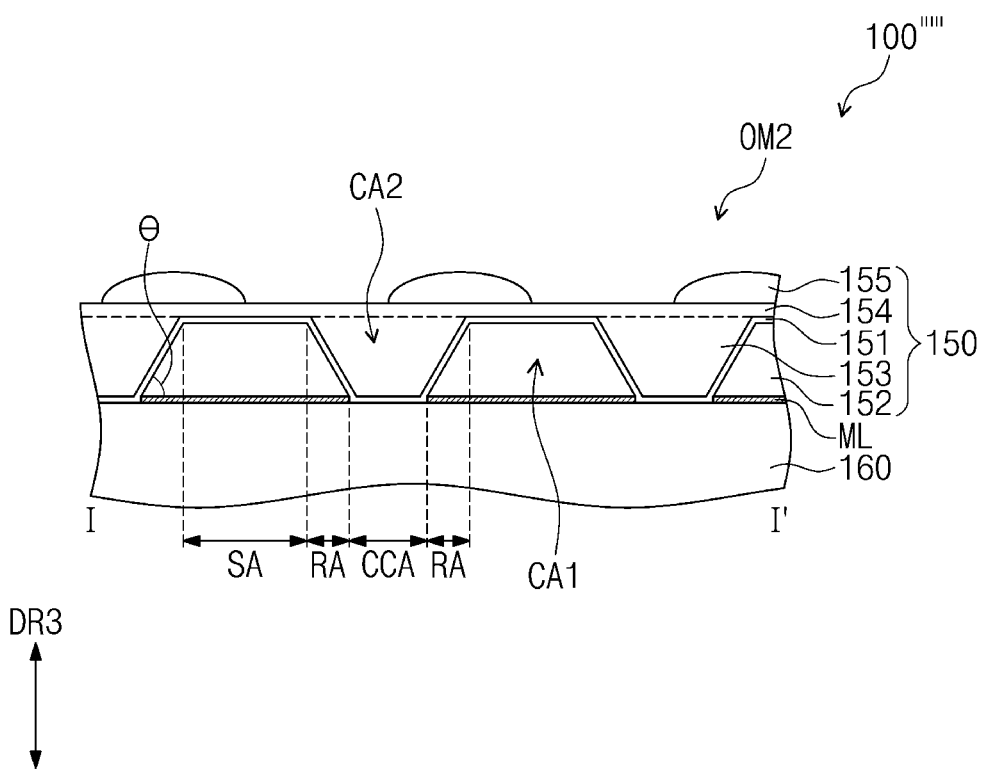
FIG. 10 is a view illustrating another exemplary embodiment of a portion of a cross-sectional view of an optical member according to the invention.

FIG. 10 is a view illustrating a portion of a cross-section of an optical member OM2 according to another exemplary embodiment of the invention.

Referring to FIG. 10, the display device 100''''' may further include a metal layer ML. The metal layer ML may be disposed between the second insulation layer 152 and the light guide member 160. In more detail, the metal layer ML may have a thin plate shape. The metal layer ML may have a bottom surface contacting the top surface of the light guide member 160 and a top surface contacting the bottom surface of the second insulation layer 152. The metal layer ML may reflect light in the light guide member 160 downward. In an exemplary embodiment, the metal layer ML may include a metal layer, e.g., molybdenum, silver, titanium, copper, aluminum, or an alloy thereof.

The contents that are the same as those described in FIGS. 4A to 4C will be omitted.

Unlike FIG. 9A, since the first cavity CA1 is not an empty space as the second insulation layer 152 is disposed in the first cavity CA1 instead of the air, stiffness of the optical member OM may be complemented. In addition, as the metal layer ML is disposed between the second insulation layer 152 and the light guide member 160, when the light traveling in the light guide member 160 is incident into the second insulation layer 152 with a predetermined angel, the critical angle at which the total reflection phenomenon occurs may be prevented from decreasing.

FIGS. 11A to 11F are cross-sectional views for explaining a method for manufacturing the display device according to an exemplary embodiment of the invention.

Hereinafter, a manufacturing method based on the display device 100 in FIG. 4A will be described in FIGS. 11A to 11F. Accordingly, description regarding each component, which is the same as that described above, will be omitted.

Figure 11A:
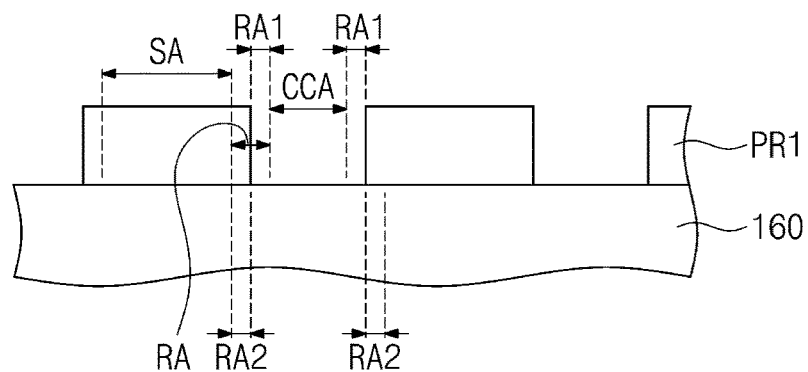
FIGS. 11A to 11F are cross-sectional views for explaining an exemplary embodiment of a method for manufacturing a display device according to the invention.
Figure 11B:
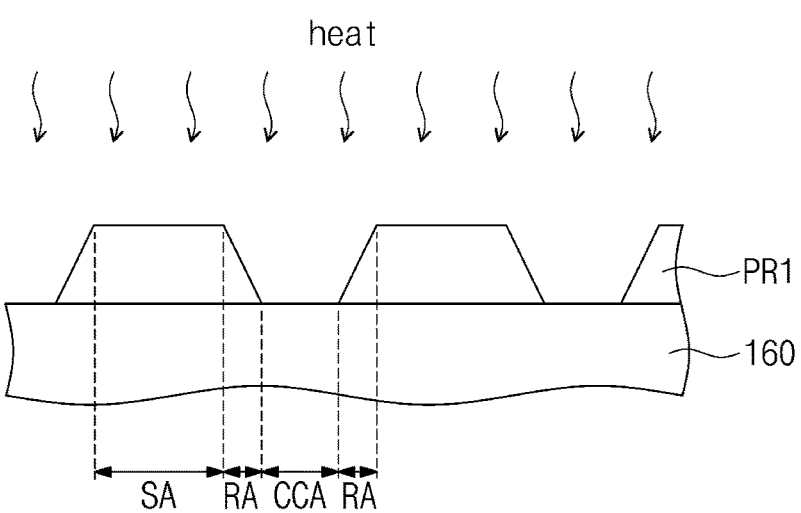

Referring to FIGS. 4A, 11A and 11B, a sacrificial layer PR1 that is an organic material may be disposed on the light guide member 160. The sacrificial layer PR1 may be formed on the entire top surface of the light guide member 160 and then patterned through a dry etching process to have a shape corresponding to that of the second insulation layer 152 in FIG. 4A. The ring area RA may include a first ring area portion RA1 corresponding to a distance between the sacrificial layer PR1 and the central area CCA and a second ring area portion RA2 corresponding to a portion of the sacrificial layer PR1.

Figure 11C:
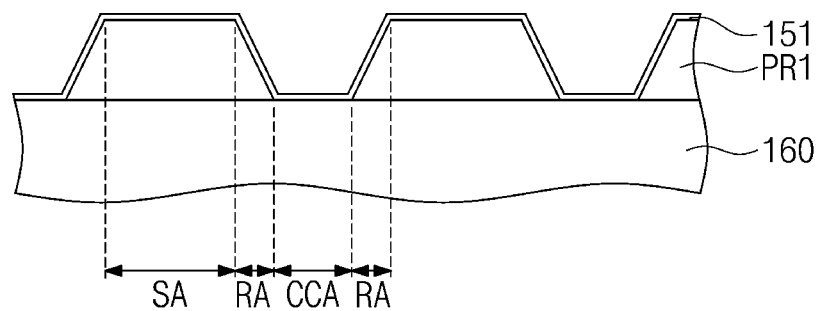

Referring to FIGS. 4A and 11C, the first insulation layer 151 may be deposited on the patterned sacrificial layer PR1.

Figure 11D:
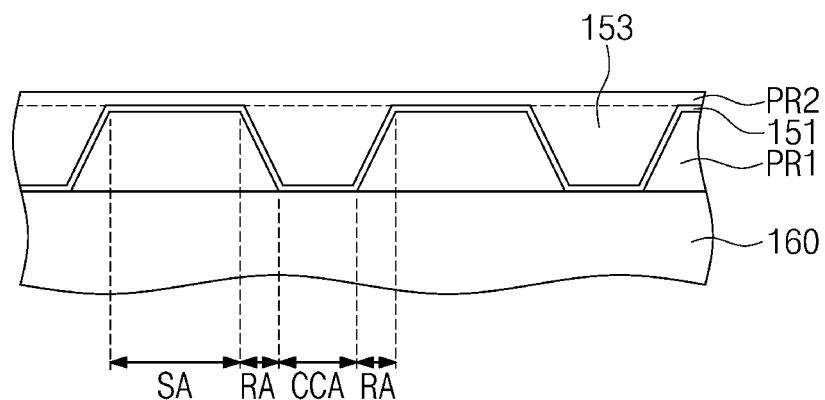

Referring to FIGS. 4A and 11D, the insulation patterns 153 may respectively overlap the central areas CCA and the ring areas RA, and a layer PR2 is disposed on the first insulation layer 151 so that the planarizing layer 154 shown in FIG. 4A may be disposed parallel to the light guide member 160 on the insulation patterns 153 through a planarization process.

Figure 11E:
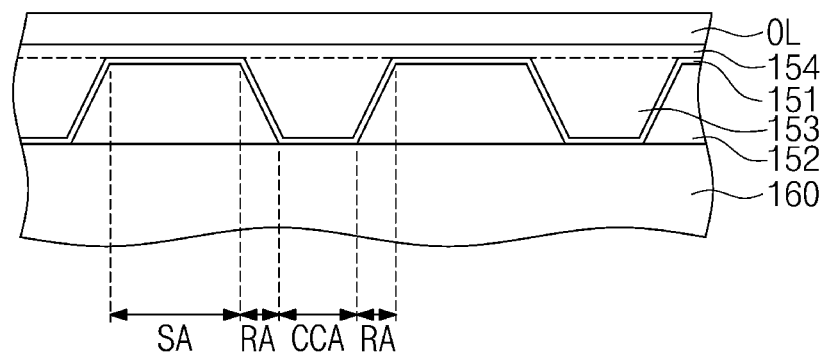

Referring to FIGS. 4A and 11E, an organic layer OL may be disposed on the planarizing layer 154.

Figure 11F:
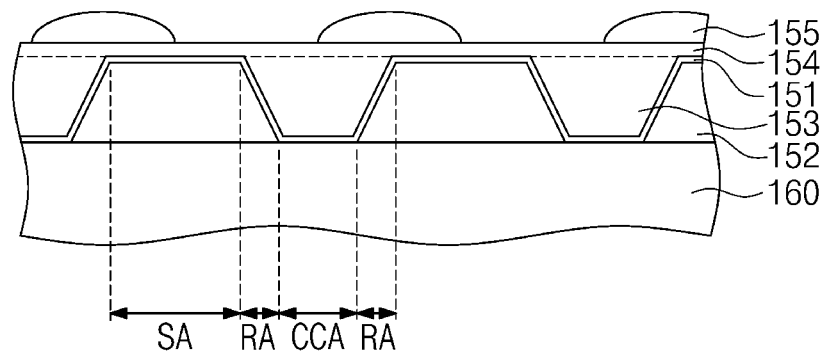

Referring to FIGS. 4A and 11F, the organic layer OL may be partially removed. In more detail, the organic layer OL may be partially removed through ultraviolet ("UV") exposure using a photo mask, for example. As a result, the organic layer PL may be partially removed to form the optical lenses 155 in FIG. 4A on the planarizing layer 154.

FIGS. 12A to 12I are cross-sectional views for explaining a method for manufacturing a display device according to another exemplary embodiment of the invention.

Hereinafter, a manufacturing method based on the display device in FIG. 9A will be described in FIGS. 12A to 12I. Accordingly, description regarding each component, which is the same as that described above, will be omitted.

Figure 12A:
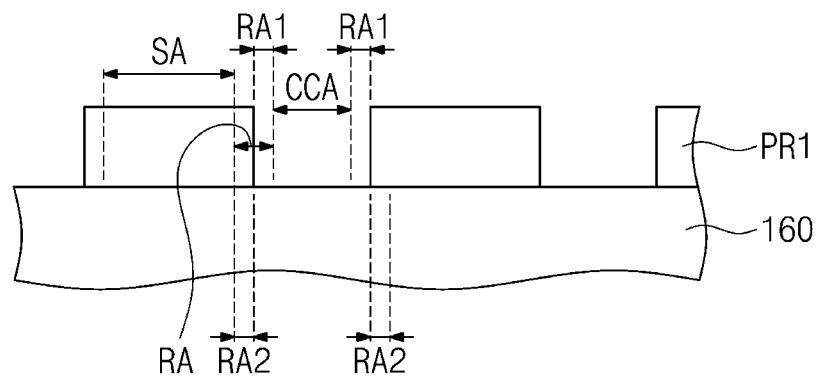
FIGS. 12A to 12I are cross-sectional views for explaining another exemplary embodiment of a method for manufacturing a display device according to the invention.

Referring to FIGS. 9A and 12A, a first photoresist pattern PR1 that is an organic material may be disposed on the light guide member 160. The first photoresist pattern PR1 may be disposed on a portion corresponding to the peripheral area SA in FIG. 4 and partially disposed on a portion corresponding to the ring areas RA on the top surface of the light guide member 160. As an example of the invention, the first photoresist pattern PR1 may be disposed on a half of the portion corresponding to the ring areas RA. Although not shown, photosensitive resin (or photoresist) is disposed on an entire surface of the light guide member 160, and then a photo mask exposing the photosensitive resin corresponding to the central areas CCA and the ring areas RA may be disposed on the photosensitive resin. The photosensitive resin corresponding to the central areas CCA and the ring areas RA may be exposed using the photo mask. As the photosensitive resin corresponding to the central areas CCA and the ring areas RA is removed by a developing solution, the first photoresist pattern PR1 may be formed. In an exemplary embodiment, the photosensitive resin used to form the first photoresist pattern PR1 may be a positive-type photoresist, for example.

Figure 12B:
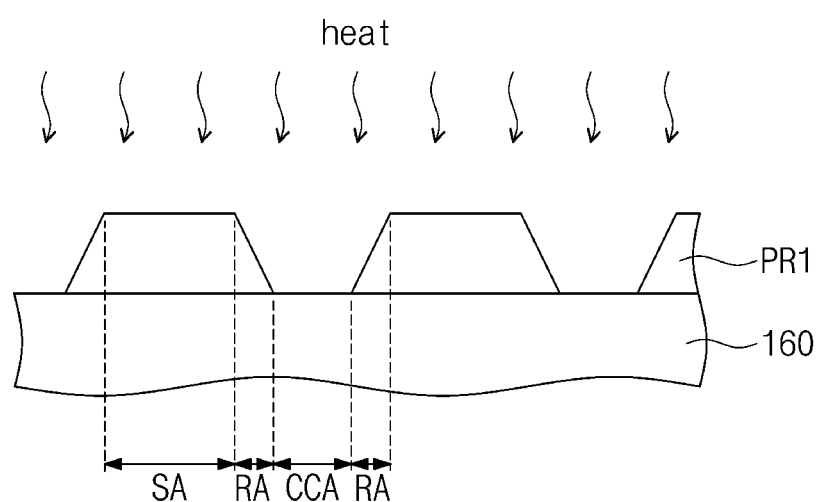

Referring to FIGS. 9A and 12B, a temporary curing process for the first photoresist pattern PR1 may be performed, and a temperature of about 130° to about 149° may be applied to the first photoresist pattern PR1 during the temporary curing process, for example. When the temperature of about 130° to about 149° is applied to the first photoresist pattern PR1 including the positive-type photoresist, the first photoresist pattern PR1 may flow-down to include an inclined side surface of the first photoresist pattern PR1.

As a result, the bottom surface of the first photoresist pattern PR1 may be formed to overlap the ring areas RA and the peripheral area SA in FIG. 9A, and the top surface of the first photoresist pattern PR1 may be formed to overlap the peripheral area SA. Also, when the temperature of about 130° to 149° is applied to the first photoresist pattern PR1, the inclined surface of the first photoresist pattern PR1 may be formed to have an angel of 60° to 70° with respect to the top surface of the light guide member 160, for example.

Figure 12C:
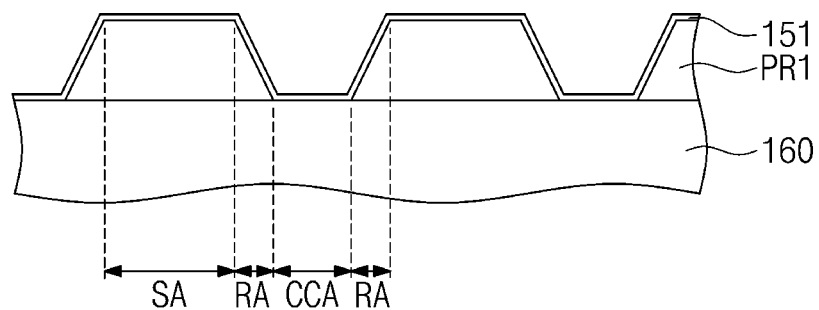

Referring to FIG. 12C, the first insulation layer 151 is disposed on the first photoresist pattern PR1. In more detail, the first insulation layer 151 may be disposed on the first photoresist pattern PR1 through a deposition method, for example.

Figure 12D:
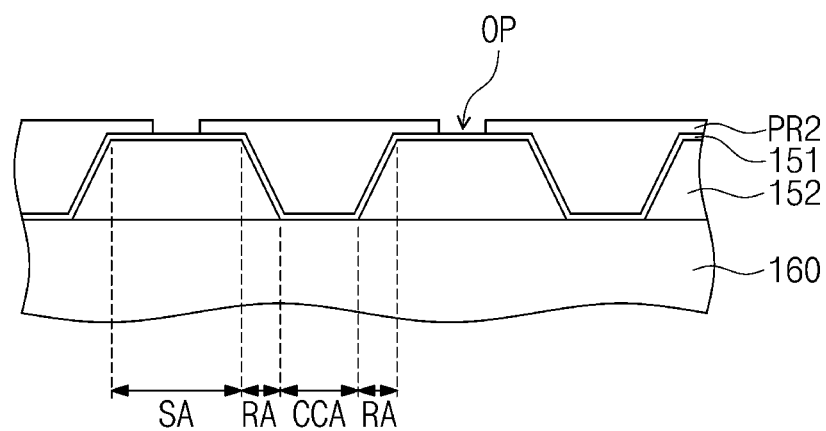

Referring to FIGS. 9A and 12D, the second photoresist pattern PR2 may be disposed on the first insulation layer 151, and a portion of the second photoresist pattern PR2, which corresponds to a portion of the peripheral area in FIG. 9A, may be removed. As a result, an opening OP may be defined.

Figure 12E:
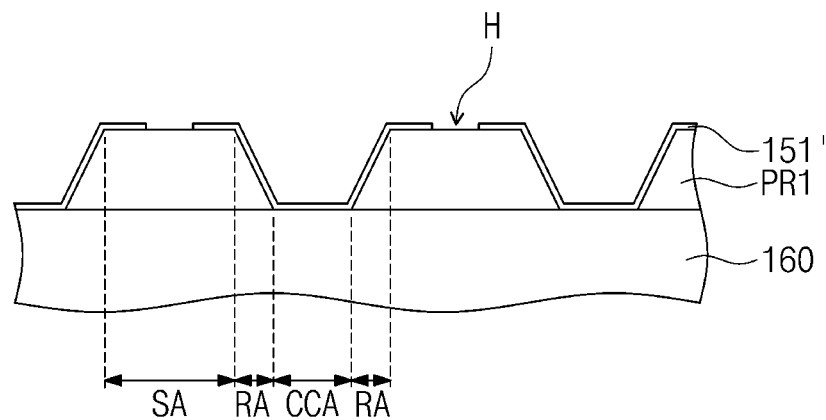

Referring to FIGS. 9A and 12E, a portion of the first insulation layer 151, which overlaps the opening OP in FIG. 12D, may be removed using the second photoresist pattern PR2 as a mask by a dry etching process, for example.

Figure 12F:
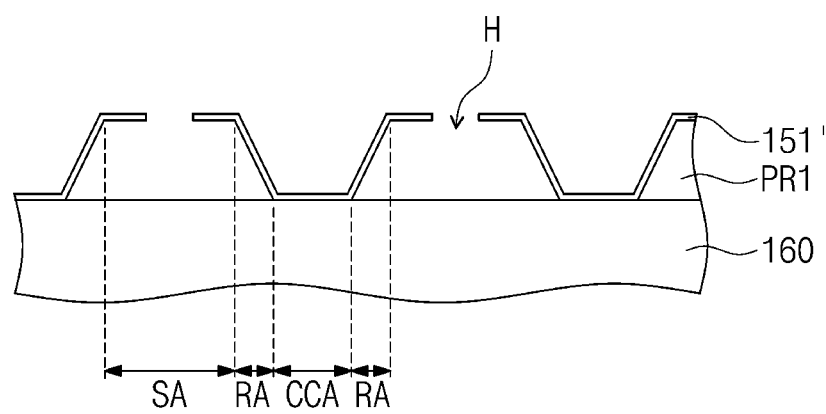

Referring to FIGS. 9A and 12F, an etching solution may be provided through a through-hole H, and resultantly, the first photoresist pattern PR1 may be removed. That is, the through-hole H serves as a passage for injecting the etching solution removing the first photoresist pattern PR1.

Figure 12G:
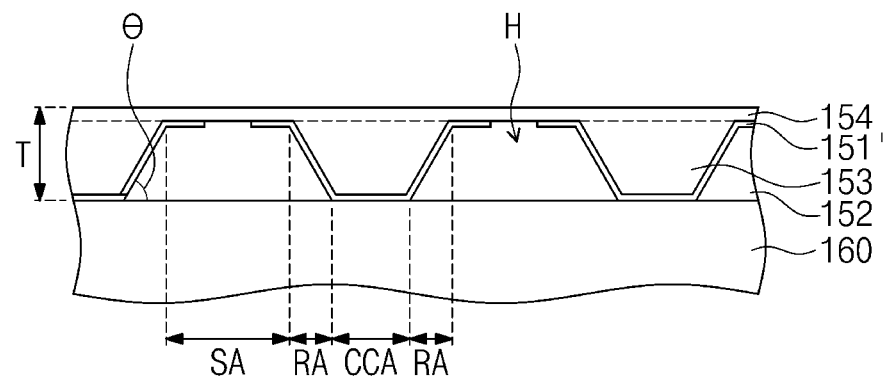
Figure 12H:
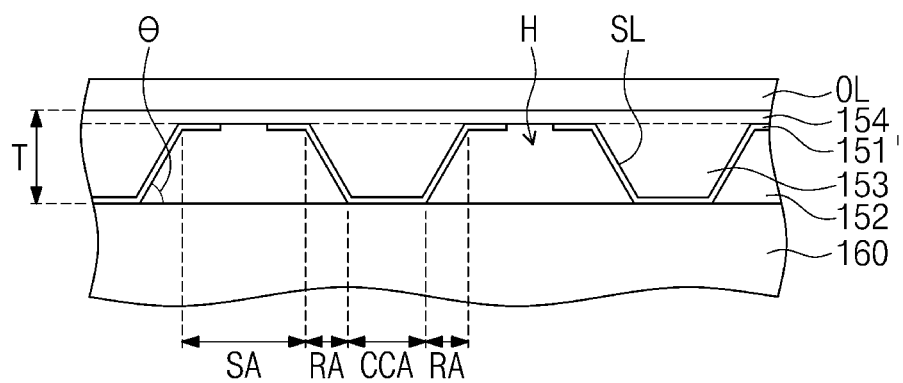
Figure 12I:
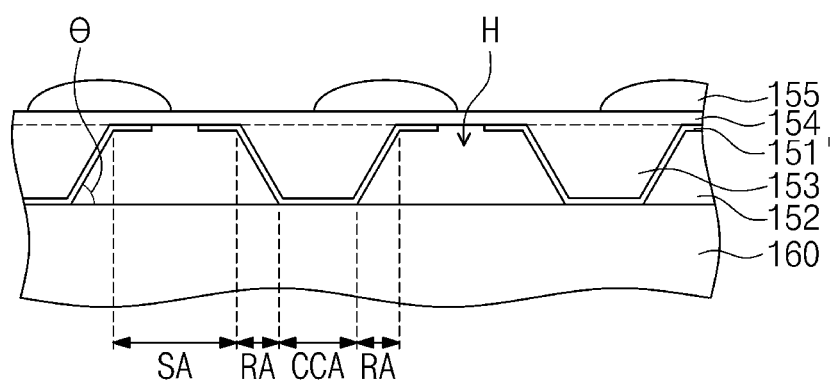

Description regarding FIGS. 12G to 12I, which is the same as that described in FIGS. 11C to 11E, will be omitted.

FIGS. 13A to 13H are cross-sectional views for explaining a method of manufacturing a display device according to another exemplary embodiment of the invention.

Hereinafter, FIGS. 13A to 13H describe a manufacturing method based on the display device 100'''' in FIG. 10. Accordingly, description regarding each component, which is the same as that described above, will be omitted.

Figure 13A:
FIGS. 13A to 13H are cross-sectional views for explaining another exemplary embodiment of a method for manufacturing a display device according to the invention.

Referring to FIGS. 10 and 13A, the light guide member 160 may be provided first.

Figure 13B:

Referring to FIGS. 10 and 13B, a metal layer ML' may be disposed on a top surface of the light guide member 160. The metal layer ML' may be disposed on the top surface of the light guide member 160 through a deposition method, for example.

Figure 13C:

Referring to FIGS. 10 and 13C, a portion of the metal layer ML' may be removed. In detail, the metal layer ML' may be partially removed to have the same shape as that of the metal layer ML in FIG. 10. The metal layer ML' may be patterned through an etching process, for example.

Figure 13D:
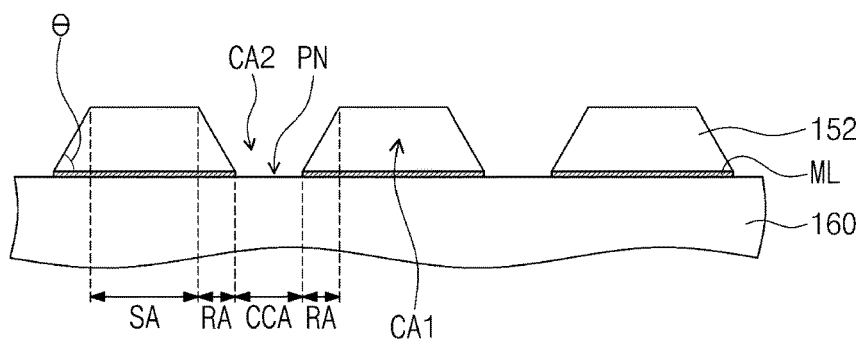
Figure 13E:
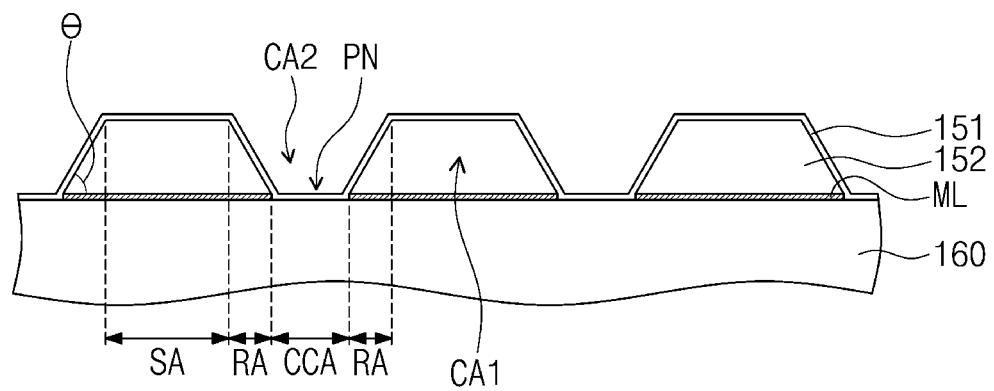
Figure 13F:
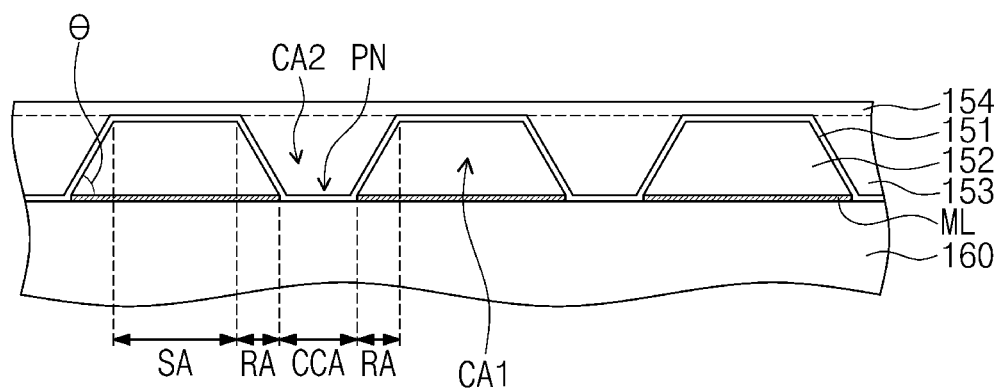
Figure 13G:
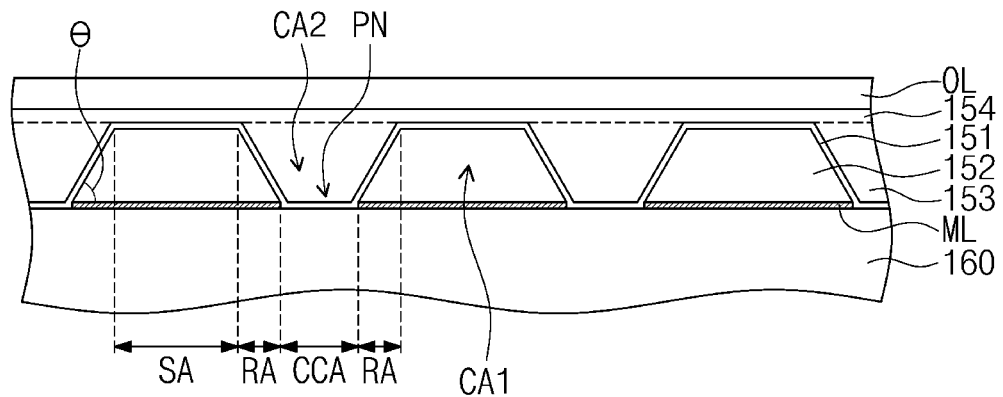
Figure 13H:
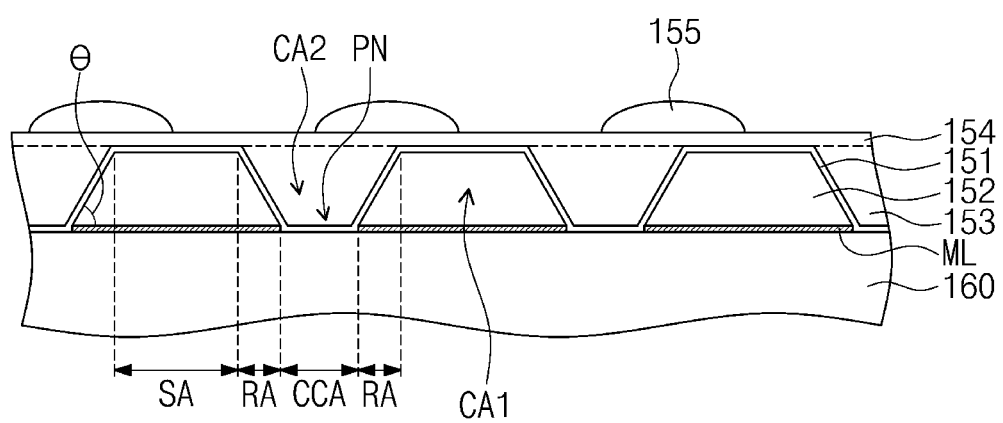

Referring to FIGS. 10 and 13D, as a result, an opening PN may be defined in the metal layer ML through a patterning process in FIG. 13C. Also, the second insulation layer 152 may be formed on the metal layer ML' through the process described in FIG. 11A.

Description regarding FIGS. 13E to 13H, which is the same as that described in FIGS. 11B to 11E, will be omitted. As a result, the bottom surface of the insulation patterns 153 may overlap the opening PN, and the optical lenses 155 may be formed by removing a portion of the organic layer OL.

According to the exemplary embodiment of the invention, as the optical lens is disposed above the insulation patterns, the light collection range may be reduced to increase the light collection efficiency of the display device.

It will be apparent to those skilled in the art that various modifications and variations can be made in the invention. Thus, it is intended that the invention covers the modifications and variations of this invention provided they come within the scope of the appended claims and their equivalents.

Hence, the real protective scope of the invention shall be determined by the technical scope of the accompanying claims.

What is claimed is:
1. A display device comprising:
a light source which generates light;
a light guide member which guides the light; and
a light collecting member which is disposed on the light guide member to collect the light provided from the light guide member, and comprises:
a first insulation layer disposed on the light guide member and comprising a plurality of central areas, a plurality of ring areas respectively surrounding the plurality of central areas, and a peripheral area which surrounds the plurality of ring areas, and is spaced farther than the plurality of central areas from the light guide member, wherein the plurality of ring areas connects the peripheral area to the plurality of central areas, wherein a first cavity is defined as a space surrounded by the light guiding member, the peripheral area, and the plurality of ring area and a second cavity is defined as a recessed space in the direction from the peripheral area to the light guide member;

a plurality of insulation patterns disposed on the first insulation layer and disposed inside the plurality of second cavities; and a plurality of optical lenses which is disposed on the plurality of insulation patterns and each of which overlaps a portion of the plurality of central areas, a portion of the plurality of ring areas, and the peripheral area, and includes an upwardly convex surface, wherein the first insulation layer has a refractive index greater than that of each of the plurality of insulation patterns.

2. The display device of claim 1, wherein each of the plurality of insulation patterns has a truncated cone shape having a diameter gradually decreasing from a lower portion of the plurality of insulation patterns to an upper portion of the plurality of insulation patterns, each of the plurality of insulation patterns has a trapezoidal shape on a cross-section, and each of side surfaces of the plurality of insulation patterns defines an angle of about 60° with respect to the light guide member on the cross-section.

3. The display device of claim 2, wherein, in a plan view, the plurality of optical lenses overlaps central points of the plurality of insulation patterns, respectively.

4. The display device of claim 1, wherein each of the plurality of optical lenses has a dome shape, and each of the plurality of optical lenses has a circular shape in a plan view.

5. The display device of claim 4, wherein when a diameter of a bottom surface of each of the plurality of optical lenses is defined as A, and a largest distance among distances from a central point of the bottom surface of each of the plurality of optical lenses to a top surface of each of the plurality of optical lenses is defined as B, a ratio of B to A is equal to or greater than about 0.3.

6. The display device of claim 4, wherein each of the plurality of central areas overlaps at least two optical lenses among the plurality of optical lenses, the light guide member includes a first side surface and a second side surface facing the first side surface, the light source is disposed adjacent to the first side surface, and the display device further comprises a reflective plate disposed adjacent to the second side surface in the light guide member to reflect the light toward the first side surface.

7. The display device of claim 1, wherein each of the plurality of optical lenses has a semi-cylindrical shape having a rectangular shaped bottom surface including a long side parallel to a first direction and a short side parallel to a second direction perpendicular to the first direction, each of the plurality of optical lenses overlaps a portion of central areas, which are arranged in the first direction, among the plurality of central areas, and the light source emits the light in the second direction.

8. The display device of claim 1, wherein the light collecting member further comprises a second insulation layer disposed below the first insulation layer and disposed in the first cavity, and the second insulation layer has a refractive index less than that of each of the first insulation layer and the light guide member.

9. The display device of claim 8, further comprising a metal layer which is disposed between the second insulation layer and the light guide member to reflect the light downward.

10. The display device of claim 9, wherein the first insulation layer has a refractive index equal to or greater than about 1.7.

11. The display device of claim 8, wherein the first insulation layer further comprises an inorganic material, the second insulation layer comprises an organic material, and each of the plurality of insulation patterns comprises an organic material.

12. The display device of claim 1, wherein the light collecting member further comprises a planarizing layer extending upward from the plurality of insulation patterns, parallel to the light guide member, and comprising an organic material, and the planarizing layer is unitary with the plurality of insulating patterns.

13. The display device of claim 12, wherein the light collecting member further comprises a second insulation layer disposed below the first insulation layer and disposed in the first cavity, and the first insulation layer has a thickness equal to or greater than about 0.6 micrometer and equal to or less than about 1.0 micrometer, and each of bottom surfaces of the plurality of ring areas has a width less than a height of the second insulation layer.

14. The display device of claim 12, wherein air is contained in the first cavity, a plurality of through-holes are defined in the peripheral area, and the air contacts the planarizing layer through the plurality of through-holes.

15. The display device of claim 1, wherein the light is reflected toward top surfaces of the plurality of ring areas by bottom surfaces of the plurality of ring areas, and the light reflected toward the top surfaces of the plurality of ring areas is refracted by the top surfaces of the plurality of ring areas to pass through the plurality of optical lenses.

16. The display device of claim 1, the plurality of optical lenses which is correspondingly disposed on and overlaps less than an entire portion of the plurality of insulation patterns and each of which overlaps less than an entire portion of the plurality of central areas, less than an entire portion of the plurality of ring areas, and the peripheral area.

* * * * *